US012752793B2

(12) United States Patent
Wang et al.

(10) Patent No.: US 12,752,793 B2
(45) Date of Patent: Oct. 6, 2026

(54) MOTION STATE ESTIMATION METHOD AND APPARATUS

(71) Applicant: Yinwang Intelligent Technologies Co., Ltd., Shenzhen (CN)

(72) Inventors: Jianguo Wang, Beijing (CN); Xuzhen Wang, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 918 days.

(21) Appl. No.: 17/542,699

(22) Filed: Dec. 6, 2021

(65) Prior Publication Data

US 2022/0089166 A1 Mar. 24, 2022

Related U.S. Application Data

(63) Continuation of application No. PCT/CN2020/093486, filed on May 29, 2020.

(30) Foreign Application Priority Data

Jun. 6, 2019 (CN) ........................ 201910503710.9

(51) Int. Cl.
*B60W 40/105* (2012.01)
*B60W 40/107* (2012.01)
(Continued)

(52) U.S. Cl.
CPC ........ *B60W 40/105* (2013.01); *B60W 40/107* (2013.01); *G01S 13/60* (2013.01); *G01S 13/86* (2013.01)

(58) Field of Classification Search
CPC ... B60W 40/105; B60W 40/107; G01C 25/00; G01C 25/005; G01S 13/60; G01S 13/86;
(Continued)

(56) References Cited

U.S. PATENT DOCUMENTS 6,300,896 B1 10/2001 Kull et al.
8,525,724 B2 * 9/2013 Insanic ................ G01S 13/951
342/26 D (Continued)

FOREIGN PATENT DOCUMENTS

CN 101320089 A 12/2008
CN 104040369 A 9/2014

(Continued)

OTHER PUBLICATIONS

Kellner Dominik et al: “Verfahren zur Bestimmung von Objekt-und Eigenbewegung auf Basis der Dopplerinformation hochauflosender Radarsensoren”, 2016, pp. 1-204, XP055903063, with an English abstract,total 204 pages.

(Continued)

*Primary Examiner* — Mohamed Abdo Algehaim
(74) *Attorney, Agent, or Firm* — Leydig, Voit & Mayer, Ltd.

(57) ABSTRACT

A motion state estimation method and apparatus relate to the fields of wireless communication and autonomous driving/intelligent driving. The method includes a step of obtaining a plurality of pieces of measurement data using a first sensor, where each of the plurality of pieces of measurement data includes at least velocity measurement information. The method further includes obtaining a motion state of the first sensor based on measurement data in the plurality of pieces of measurement data that corresponds to a target reference object, where the motion state includes at least a velocity vector of the first sensor. In the present disclosure, a more accurate motion state of the first sensor can be obtained, and a vehicle's autonomous driving capability or advanced driver assistant system (ADAS) capability is further improved.

20 Claims, 6 Drawing Sheets

(51) Int. Cl.
*G01S 13/60* (2006.01)
*G01S 13/86* (2006.01)

(58) Field of Classification Search
CPC ........ G01S 13/865; G01S 7/41; G01S 13/867; G01S 13/931; G01S 15/588; G01S 15/60; G01S 15/931; G01S 13/589
USPC ........................................................ 701/93
See application file for complete search history.

(56) References Cited

U.S. PATENT DOCUMENTS

| | | | | |
|---|---|---|---|---|
| 8,855,848 | B2 * | 10/2014 | Zeng | G01S 13/865 701/28 |
| 10,140,855 | B1 * | 11/2018 | Swaminathan | G06V 20/58 |
| 10,473,780 | B1 * | 11/2019 | Brown | G08G 1/16 |
| 11,125,872 | B2 * | 9/2021 | Stachnik | G01S 13/584 |
| 11,511,735 | B2 * | 11/2022 | Yukawa | B60W 30/09 |
| 2010/0017128 | A1 * | 1/2010 | Zeng | G01S 13/865 342/70 |
| 2010/0321235 | A1 * | 12/2010 | Vossiek | G01S 13/9089 342/25 A |
| 2011/0295548 | A1 * | 12/2011 | Takabayashi | G01S 13/931 702/150 |
| 2012/0086596 | A1 * | 4/2012 | Insanic | G01S 7/003 342/26 D |
| 2013/0124061 | A1 * | 5/2013 | Khanafer | G01S 13/867 701/1 |
| 2015/0005993 | A1 * | 1/2015 | Breuing | B61L 23/041 701/19 |
| 2016/0178742 | A1 * | 6/2016 | Shikatani | G01S 13/931 342/113 |
| 2016/0223661 | A1 * | 8/2016 | Song | G01S 13/86 |
| 2017/0010302 | A1 * | 1/2017 | Steurer | G01P 7/00 |
| 2017/0299707 | A1 * | 10/2017 | Nguyen | B60T 7/12 |
| 2017/0350712 | A1 * | 12/2017 | Tateishi | G01C 21/3602 |
| 2018/0067966 | A1 * | 3/2018 | Oder | G01S 15/931 |
| 2018/0126936 | A1 * | 5/2018 | Nell | B60T 8/58 |
| 2018/0162389 | A1 * | 6/2018 | Minemura | B60W 50/029 |
| 2018/0341263 | A1 * | 11/2018 | Rust | G05D 1/0253 |
| 2018/0364717 | A1 * | 12/2018 | Douillard | G01S 17/931 |
| 2018/0370531 | A1 * | 12/2018 | Matsunaga | B60R 21/00 |
| 2019/0130752 | A1 * | 5/2019 | Takaki | B60T 7/12 |
| 2019/0135292 | A1 * | 5/2019 | Parikh | B60W 30/18163 |
| 2019/0180451 | A1 * | 6/2019 | Kellner | G06T 7/285 |
| 2019/0187267 | A1 * | 6/2019 | Li | G01S 13/931 |
| 2019/0258878 | A1 * | 8/2019 | Koivisto | G06V 10/774 |
| 2019/0324134 | A1 * | 10/2019 | Cattle | G01S 7/024 |
| 2019/0346561 | A1 * | 11/2019 | Hofmann | G01S 13/58 |
| 2019/0361106 | A1 * | 11/2019 | Stachnik | G01S 13/588 |
| 2019/0369222 | A1 * | 12/2019 | Oh | G01S 13/931 |
| 2019/0383932 | A1 * | 12/2019 | Flores Tapia | G01S 7/292 |
| 2020/0182992 | A1 * | 6/2020 | Kellner | G01S 13/589 |
| 2020/0183002 | A1 * | 6/2020 | Lee | G01S 19/14 |
| 2020/0293064 | A1 * | 9/2020 | Wu | G06N 3/045 |
| 2021/0124033 | A1 * | 4/2021 | Ziegler | G01S 13/931 |
| 2021/0190922 | A1 * | 6/2021 | Yu | G01S 17/86 |
| 2022/0036043 | A1 * | 2/2022 | Sakashita | G01S 13/931 |
| 2022/0244373 | A1 * | 8/2022 | Lessmann | G01S 13/44 |

FOREIGN PATENT DOCUMENTS

| | | | |
|---|---|---|---|
| CN | 106413530 | A | 2/2017 |
| CN | 107132542 | A | 9/2017 |
| CN | 108663676 | A | 10/2018 |
| CN | 108872975 | A | 11/2018 |
| CN | 109690344 | A | 4/2019 |
| CN | 110554376 | A | 12/2019 |
| EP | 0881505 | A1 | 12/1998 |
| EP | 2017647 | A1 | 1/2009 |
| EP | 3349033 | A1 | 7/2018 |

OTHER PUBLICATIONS

Dominik Kellner et al: “Instantaneous ego-motion estimation using Doppler radar”, 16th International IEEE Conference on Intelligent Transportation Systems (ITSC 2013), Oct. 2013 (Oct. 2013), pp. 869-874, XP055604073, total 6 pages.

Matthias Rapp et al.,“A Fast Probabilistic Ego-Motion Estimation Framework for Radar”,2015 IEEE,total 6 pages.

* cited by examiner

MOTION STATE ESTIMATION METHOD AND APPARATUS

CROSS-REFERENCE TO RELATED APPLICATIONS

This application is a continuation of International Application No. PCT/CN2020/093486, filed on May 29, 2020, which claims priority to Chinese Patent Application No. 201910503710.9, filed on Jun. 6, 2019. The disclosures of the aforementioned applications are hereby incorporated by reference in their entireties.

TECHNICAL FIELD

The present invention relates to the field of Internet-of-vehicles technologies, and in particular, to methods and apparatuses for estimating sensor motion state.

BACKGROUND

A plurality of types of sensors such as radar sensors, ultrasonic sensors, and vision sensors are usually configured in advanced driver assistant systems (ADASs) or autonomous driving (AD) systems, to sense ambient environments and target information. Information obtained by using sensors may be used to implement functions such as classification, recognition, and tracking of ambient environment and objects, and may be further used to implement situation assessment of ambient environment, planning and control, and the like. For example, track information of a tracked target may be used as an input of vehicle planning and control, to improve efficiency and safety. Platforms where the sensors may be installed include in-vehicle systems, ship-borne systems, airborne systems, satellite-borne systems, or the like. Motion of the sensor platforms affects implementation of functions such as classification, recognition, and tracking. Specifically, using the application of an in-vehicle system as an example, a sensor moves along with a vehicle in which the sensor is located, and a target (for example, a target vehicle) in a field of view of the sensor also moves. In this case, after the motion states of the sensor and the target are superimposed onto each other, the motion of the target as observed by the sensor becomes irregular. Using a radar sensor, a sonar sensor, or an ultrasonic sensor as an example, in a scenario shown in FIG. 1, the radar sensor, the sonar sensor, or the ultrasonic sensor is configured on a vehicle a to measure the location information and velocity information of a target vehicle, vehicle b. The vehicle a travels straight, and the vehicle b turns right. It can be learned from FIG. 2 that the traveling track of the vehicle b as observed by the sensor on the vehicle a is irregular. Therefore, estimating the motion state of the sensor and compensating for the impact of the motion of the sensor can effectively improve the precision in tracking of the target.

A manner of obtaining the motion state of the sensor includes: (1) Positioning is performed via a global navigation satellite system (GNSS), for example, a global positioning system (GPS) satellite, and the distances between a receiver of the ego-vehicle and a plurality of satellites are measured, so that a specific location of the ego-vehicle can be calculated; and a motion state of the ego-vehicle may be obtained based on specific locations that are at a plurality of consecutive moments. However, the precision of civil GNSSs is low and is usually at the meter scale. Consequently, large errors usually exist in this approach. (2) An inertial measurement unit (IMU) can measure a three-axis attitude angle and a three-axis acceleration of the ego-vehicle, and the IMU estimates a motion state of the ego-vehicle by using the measured acceleration and attitude angle of the ego-vehicle. However, the IMU has a disadvantage of error accumulation and is susceptible to electromagnetic interference. It can be learned that a motion state that is of an ego-vehicle and that is measured by using a conventional technology tend to have large errors, and how to obtain a more accurate motion state of a sensor is a technical problem being studied by a person skilled in the art.

SUMMARY

Embodiments of the present invention disclose a motion state estimation method and apparatus, to obtain a more accurate motion state of a first sensor.

According to a first aspect, an embodiment of this application provides a motion state estimation method. The method includes:

- obtaining a plurality of pieces of measurement data by using a first sensor, where each of the plurality of pieces of measurement data includes at least velocity measurement information; and
- obtaining or determining a motion state of the first sensor based on measurement data in the plurality of pieces of measurement data that corresponds to a target reference object, where the motion state includes at least a velocity vector of the first sensor.

In the foregoing method, the plurality of pieces of measurement data are obtained by using the first sensor, and the motion state of the first sensor is determined based on the measurement data in the plurality of pieces of measurement data that corresponds to the target reference object, where the measurement data includes at least the velocity measurement information. When a relative motion occurs between the first sensor and the target reference object, the measurement data of the first sensor may include measurement information of a velocity of the relative motion. Therefore, the motion state of the first sensor may be obtained based on the measurement data corresponding to the target reference object. In addition, usually, the target reference object may be spatially diversely distributed relative to the sensor, and particularly, has different geometric relationships with the first sensor. Therefore, there are different measurement equations between the velocity measurement data and the first sensor, and in particular, the quantity of conditions of a measurement matrix in the measurement equation is reduced. Moreover, a large amount of measurement data corresponding to the target reference object is provided, so that the impact of noise or interference on a motion state estimation is effectively reduced. Therefore, according to the method in the present invention, the measurement data corresponding to the target reference object, in particular, the geometric relationship of the target reference object relative to the sensor and the amount of the measurement data, can be effectively used to reduce impact of a measurement error or interference, so that a higher precision is achieved in this manner of determining the motion state. In addition, according to the method, the motion estimation of the sensor can be obtained by using only single-frame data, so that good real-time performance can be achieved.

With reference to the first aspect, in a first possible implementation of the first aspect, the target reference object is an object that is stationary relative to a reference system.

With reference to the first aspect or any possible implementation of the first aspect, in a second possible implementation of the first aspect, after obtaining the plurality of pieces of measurement data by using a first sensor, where each of the plurality of pieces of measurement data includes at least velocity measurement information, and before obtaining or determining the motion state of the first sensor based on measurement data in the plurality of pieces of measurement data that corresponds to a target reference object, the method further includes:

determining, from the plurality of pieces of measurement data based on a feature of the target reference object, the measurement data corresponding to the target reference object.

With reference to any one of the first aspect or the foregoing possible implementations of the first aspect, in a third possible implementation of the first aspect, the feature of the target reference object includes a geometric feature and/or a reflectance feature of the target reference object.

With reference to any one of the first aspect or the foregoing possible implementations of the first aspect, in a fourth possible implementation of the first aspect, after obtaining the plurality of pieces of measurement data by using a first sensor, where each of the plurality of pieces of measurement data includes at least velocity measurement information, and before obtaining the motion state of the first sensor based on measurement data in the plurality of pieces of measurement data that corresponds to a target reference object, the method further includes:

determining, from the plurality of pieces of measurement data of the first sensor based on measurement data of a second sensor, the measurement data corresponding to the target reference object.

With reference to any one of the first aspect or the foregoing possible implementations of the first aspect, in a fifth possible implementation of the first aspect, the determining, from the plurality of pieces of measurement data of the first sensor based on data of a second sensor, the measurement data corresponding to the target reference object includes:

- mapping the measurement data of the first sensor to a space of the measurement data of the second sensor;
- mapping the measurement data of the second sensor to a space of the measurement data of the first sensor; or
- mapping the measurement data of the first sensor and the measurement data of the second sensor to a common space; and
- determining, by using a space and based on the target reference object determined based on the measurement data of the second sensor, the measurement data that is of the first sensor and that corresponds to the target reference object.

With reference to any one of the first aspect or the foregoing possible implementations of the first aspect, in a sixth possible implementation of the first aspect, the obtaining a motion state of the first sensor based on measurement data in the plurality of pieces of measurement data that corresponds to a target reference object includes:

obtaining the motion state of the first sensor through a least squares LS estimation and/or sequential block filtering based on the measurement data in the plurality of pieces of measurement data that corresponds to the target reference object. It may be understood that the estimation precision of the motion state (for example, a velocity) of the first sensor can be more effectively improved through the LS estimation and/or the sequential filtering estimation.

With reference to any one of the first aspect or the foregoing possible implementations of the first aspect, in a seventh possible implementation of the first aspect, the obtaining the motion state of the first sensor through a least squares LS estimation and/or sequential block filtering based on the measurement data in the plurality of pieces of measurement data that corresponds to the target reference object includes:

performing sequential filtering based on M radial velocity vectors corresponding to the target reference object and measurement matrices corresponding to the M radial velocity vectors, to obtain a motion estimate of the first sensor, where M≥2, the radial velocity vector includes K radial velocity measured values in the measurement data in the plurality of pieces of measurement data that corresponds to the target reference object, the corresponding measurement matrix includes K directional cosine vectors, and K≥1.

With reference to any one of the first aspect or the foregoing possible implementations of the first aspect, in an eighth possible implementation of the first aspect, the motion velocity vector of the first sensor is a two-dimensional vector, K=2, and the measurement matrix corresponding to the radial velocity vector is:

$$H_{m,K}=\begin{bmatrix}\cos\theta_{m,1} & \sin\theta_{m,1}\\ \cos\theta_{m,2} & \sin\theta_{m,2}\end{bmatrix}$$

where $\theta_{m,i}$ is an $i^{th}$ piece of azimuth measurement data in an $m^{th}$ group of measurement data of the target reference object, and i=1 or 2; or the motion velocity vector of the first sensor is a three-dimensional vector, K=3, and the measurement matrix corresponding to the radial velocity vector is:

$$H_{m,K}=\begin{bmatrix}\cos\phi_{m,1}\cdot\cos\theta_{m,1} & \cos\phi_{m,1}\cdot\sin\theta_{m,1} & \sin\phi_{m,1}\\ os\phi_{m,2}\cdot\cos\theta_{m,2} & \cos\phi_{m,2}\cdot\sin\theta_{m,2} & \sin\phi_{m,2}\\ os\phi_{m,3}\cdot\cos\theta_{m,3} & \cos\phi_{m,3}\cdot\sin\theta_{m,3} & \sin\phi_{m,3}\end{bmatrix}$$

where $\theta_{m,i}$ is an $i^{th}$ piece of azimuth measurement data in an $m^{th}$ group of measurement data of the target reference object, $\phi_{m,i}$ is an $i^{th}$ piece of pitch angle measurement data in the $m^{th}$ group of measurement data of the target reference object, and i=1, 2, or 3.

With reference to any one of the first aspect or the foregoing possible implementations of the first aspect, in a ninth possible implementation of the first aspect, a formula for the sequential filtering is:

$$v_{s,m}^{MMSE}=v_{s,m-1}^{MMSE}+G_m\left(-\dot{r}_{m,K}-H_{m,K}*v_{s,m-1}^{MMSE}\right)$$

$$G_m=P_{m,1|0}*H_{m,K}^T*\left(H_{m,K}*P_{m,1|0}*H_{m,K}^T+R_{m,K}\right)^{-1}$$

$$P_{m,1|0}=P_{m-1,1|1}$$

$$P_{m,1|1}=(I-G_{m-1}H_{m-1,K})P_{m,1|0}$$

where $$v_{s,m}^{MMSE}$$

is a velocity vector estimate of an $m^{th}$ time of filtering, $G_m$ is a gain matrix, $\dot{r}_{m,K}$ is an $m^{th}$ radial velocity vector measured value, $R_{m,K}$ is an $m^{th}$ radial velocity vector measurement error covariance matrix, and m=1, 2, . . . , or M.

According to a second aspect, an embodiment of this application provides a motion state estimation apparatus. The apparatus includes a processor, a memory, and a first sensor, where the memory is configured to store program instructions, and the processor is configured to invoke the program instructions to perform the following operations:

obtaining a plurality of pieces of measurement data by using the first sensor, where each of the plurality of pieces of measurement data includes at least velocity measurement information; and obtaining a motion state of the first sensor based on measurement data in the plurality of pieces of measurement data that corresponds to a target reference object, where the motion state includes at least a velocity vector of the first sensor.

In the foregoing apparatus, the plurality of pieces of measurement data are obtained by using the first sensor, and the motion state of the first sensor is obtained based on the measurement data in the plurality of pieces of measurement data that corresponds to the target reference object, where the measurement data includes at least the velocity measurement information. When a relative motion occurs between the first sensor and the target reference object, the measurement data of the first sensor may include measurement information of a velocity of the relative motion. Therefore, the motion state of the first sensor may be obtained based on the measurement data corresponding to the target reference object. In addition, usually, the target reference object may be spatially diversely distributed relative to the sensor, and particularly, may have different geometric relationships with the first sensor. Therefore, there are different measurement equations between the velocity measurement data and the first sensor, and in particular, the quantity of conditions of a measurement matrix in the measurement equation is reduced. Moreover, a large amount of measurement data corresponding to the target reference object can be provided, so that the impact of noise or interference on a motion state estimation is effectively reduced. Therefore, according to the method in the present invention, the measurement data corresponding to the target reference object, in particular, the geometric relationship of the target reference object relative to the sensor and the amount of the measurement data, can be effectively used to reduce the impact of a measurement error or interference, so that a higher precision is achieved in this manner of determining the motion state. In addition, according to the method, a motion estimation of the sensor can be obtained by using only single-frame data so that good real-time performance can be achieved.

With reference to the second aspect, in a first possible implementation of the second aspect, the target reference object is an object that is stationary relative to a reference system.

With reference to the second aspect or any possible implementation of the second aspect, in a second possible implementation of the second aspect, after obtaining the plurality of pieces of measurement data by using the first sensor, where each of the plurality of pieces of measurement data includes at least velocity measurement information, and before obtaining the motion state of the first sensor based on measurement data in the plurality of pieces of measurement data that corresponds to a target reference object, the processor is further configured to:

determine, from the plurality of pieces of measurement data based on a feature of the target reference object, the measurement data corresponding to the target reference object.

With reference to any one of the second aspect or the foregoing possible implementations of the second aspect, in a third possible implementation of the second aspect, the feature of the target reference object includes a geometric feature and/or a reflectance feature of the target reference object.

With reference to any one of the second aspect or the foregoing possible implementations of the second aspect, in a fourth possible implementation of the second aspect, after obtaining the plurality of pieces of measurement data by using the first sensor, where each of the plurality of pieces of measurement data includes at least velocity measurement information, and before obtaining the motion state of the first sensor based on measurement data in the plurality of pieces of measurement data that corresponds to a target reference object, the processor is further configured to:

determine, from the plurality of pieces of measurement data of the first sensor based on measurement data of a second sensor, the measurement data corresponding to the target reference object.

With reference to any one of the second aspect or the foregoing possible implementations of the second aspect, in a fifth possible implementation of the second aspect, the determining, from the plurality of pieces of measurement data of the first sensor based on measurement data of a second sensor, the measurement data corresponding to the target reference object comprises:

mapping the measurement data of the first sensor to a space of the measurement data of the second sensor;

mapping the measurement data of the second sensor to a space of the measurement data of the first sensor; or mapping the measurement data of the first sensor and the measurement data of the second sensor to a common space; and determining, by using a space and based on the target reference object determined based on the measurement data of the second sensor, the measurement data that is of the first sensor and that corresponds to the target reference object.

With reference to any one of the second aspect or the foregoing possible implementations of the second aspect, in a sixth possible implementation of the second aspect, the obtaining a motion state of the first sensor based on measurement data in the plurality of pieces of measurement data that corresponds to a target reference object comprises:

obtaining the motion state of the first sensor through a least squares LS estimation and/or sequential block filtering based on the measurement data in the plurality of pieces of measurement data that corresponds to the target reference object. It may be understood that the estimation precision of the motion state (for example, a velocity) of the first sensor can be more effectively improved through the LS estimation and/or the sequential filtering estimation.

With reference to any one of the second aspect or the foregoing possible implementations of the second aspect, in a seventh possible implementation of the second aspect, the obtaining the motion state of the first sensor through a least squares LS estimation and/or sequential block filtering based on the measurement data in the plurality of pieces of measurement data that corresponds to the target reference object comprises:

performing sequential filtering based on M radial velocity vectors corresponding to the target reference object and measurement matrices corresponding to the M radial velocity vectors, to obtain a motion estimate of the first sensor, where M≥2, the radial velocity vector includes K radial velocity measured values in the measurement data in the plurality of pieces of measurement data that corresponds to the target reference object, the corresponding measurement matrix includes K directional cosine vectors, and K≥1.

With reference to any one of the second aspect or the foregoing possible implementations of the second aspect, in an eighth possible implementation of the second aspect, the motion velocity vector of the first sensor is a two-dimensional vector, K=2, and the measurement matrix corresponding to the radial velocity vector is:

$$H_{m,K} = \begin{bmatrix} \cos\theta_{m,1} & \sin\theta_{m,1} \\ \cos\theta_{m,2} & \sin\theta_{m,2} \end{bmatrix}$$

where $\theta_{m,i}$ is an $i^{th}$ piece of azimuth measurement data in an $m^{th}$ group of measurement data of the target reference object, and i=1 or 2; or the motion velocity vector of the first sensor is a three-dimensional vector, K=3, and the measurement matrix corresponding to the radial velocity vector is:

$$H_{m,K} = \begin{bmatrix} \cos\phi_{m,1}\cdot\cos\theta_{m,1} & \cos\phi_{m,1}\cdot\sin\theta_{m,1} & \sin\phi_{m,1} \\ os\phi_{m,2}\cdot\cos\theta_{m,2} & os\phi_{m,2}\cdot\sin\theta_{m,2} & \sin\phi_{m,2} \\ os\phi_{m,3}\cdot\cos\theta_{m,3} & \cos\phi_{m,3}\cdot\sin\theta_{m,3} & \sin\phi_{m,3} \end{bmatrix}$$

where $\theta_{m,i}$ is an $i^{th}$ piece of azimuth measurement data in an $m^{th}$ group of measurement data of the target reference object, $\phi_{mi}$ is an $i^{th}$ piece of pitch angle measurement data in the $m^{th}$ group of measurement data of the target reference object, and i=1, 2, or 3.

With reference to any one of the second aspect or the foregoing possible implementations of the second aspect, in a ninth possible implementation of the second aspect, a formula for the sequential filtering is:

$$v_{s,m}^{MMSE} = v_{s,m-1}^{MMSE} + G_m\left(-\dot{r}_{m,K} - H_{m,K} * v_{s,m-1}^{MMSE}\right)$$

$$G_m = P_{m,1|0} * H_{m,K}^T * \left(H_{m,K} * P_{m,1|0} * H_{m,K}^T + R_{m,K}\right)^{-1}$$

$$P_{m,1|0} = P_{m-1,1|1}$$

$$P_{m,1|1} = (I - G_{m-1}H_{m-1,K})P_{m,1|0}$$

where $$v_{s,m}^{MMSE}$$

is a velocity vector estimate of an $m^{th}$ time of filtering, $G_m$ is a gain matrix, $\dot{r}_{m,K}$ is an $m^{th}$ radial velocity vector measured value, $R_{m,K}$ is an $m^{th}$ radial velocity vector measurement error covariance matrix, and m=1, 2, . . . , or M.

According to a third aspect, an embodiment of this application provides a motion state estimation apparatus, where the apparatus includes all or a part of units configured to perform the method according to any one of the first aspect or the possible implementations of the first aspect.

During implementation of the embodiments of the present invention, the plurality of pieces of measurement data are obtained by using the first sensor, and the motion state of the first sensor is obtained based on the measurement data in the plurality of pieces of measurement data that corresponds to the target reference object, where the measurement data includes at least the velocity measurement information. When a relative motion occurs between the first sensor and the target reference object, the measurement data of the first sensor may include the measurement information of the velocity of the relative motion. Therefore, the motion state of the first sensor may be obtained based on the measurement data corresponding to the target reference object. In addition, usually, the target reference object may be spatially diversely distributed relative to the sensor, and particularly, may have different geometric relationships with the first sensor. Therefore, there are different measurement equations between the velocity measurement data and the first sensor, and in particular, the quantity of conditions of the measurement matrix in the measurement equation is reduced. Moreover, a large amount of measurement data corresponding to the target reference object is provided so that the impact of noise or interference on the motion state estimation is effectively reduced. Therefore, according to the method in the present invention, the measurement data corresponding to the target reference object, in particular, the geometric relationship of the target reference object relative to the sensor and the amount, can be effectively used to reduce the impact of the measurement error or interference so that a higher precision is achieved in this manner of determining the motion state. In addition, the motion estimation of the sensor can be obtained by using only the single-frame data, so that good real-time performance can be achieved. Further, it may be understood that the estimation precision of the motion state (for example, the velocity) of the first sensor can be more effectively improved through the LS estimation and/or the sequential filtering estimation.

BRIEF DESCRIPTION OF DRAWINGS

The following describes accompanying drawings used in embodiments of the present invention.

DESCRIPTION OF EMBODIMENTS

The following describes embodiments of the present invention with reference to accompanying drawings in the embodiments of the present application.

Figure 1:
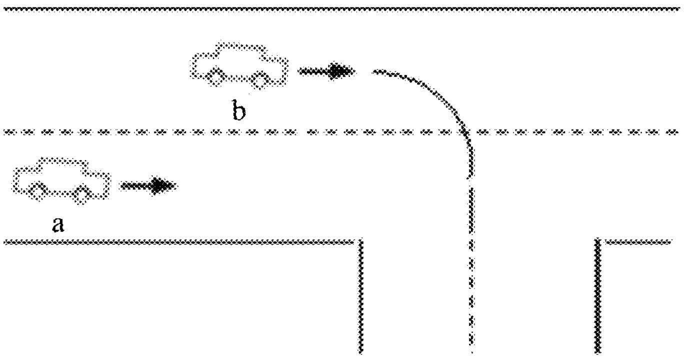
FIG. 1 is a schematic diagram of a vehicle motion scenario in a conventional technology.
Figure 2:
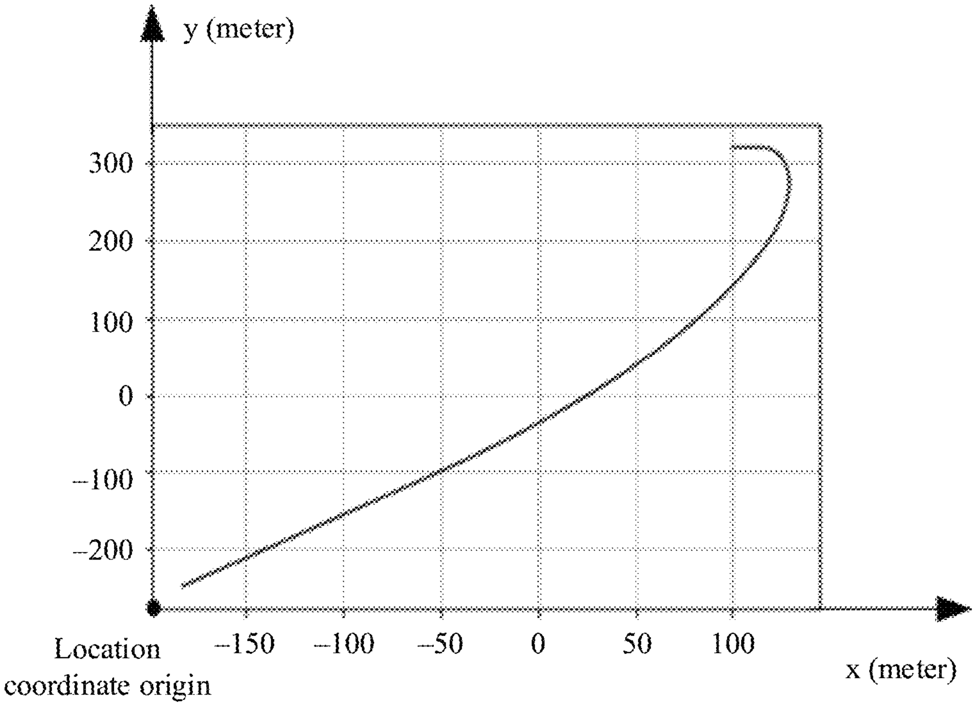
FIG. 2 is a schematic diagram of a motion state of a target object detected by radar in a conventional technology.
Figure 3:
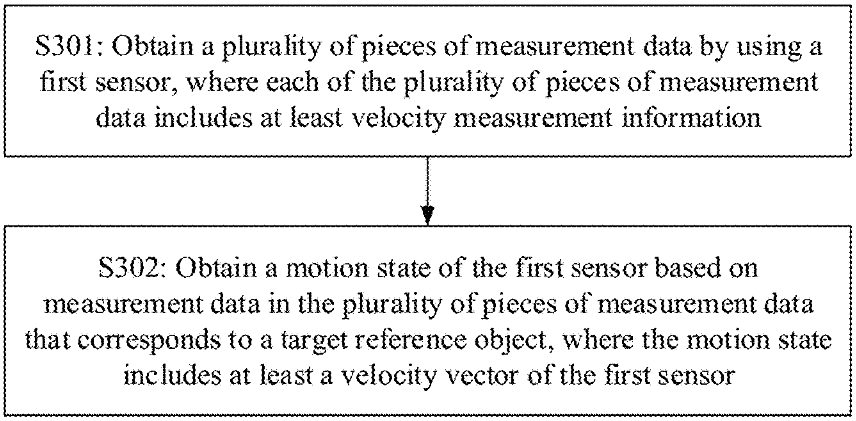
FIG. 3 is a schematic flowchart of a motion state estimation method according to an embodiment of the present application.

Refer to FIG. 3. FIG. 3 shows a motion state estimation method according to an embodiment of the present application. The method may be performed by a sensor system, a fusion sensing system, or a planning/control system (for example, an assisted driving system or an autonomous driving system) integrating the foregoing systems, and may be in a form of software or hardware (for example, may be a motion state estimation apparatus connected to or integrated with a corresponding sensor in a wireless or wired manner). The following different execution steps may be implemented in a centralized manner or in a distributed manner.

The method includes but is not limited to the following steps.

Step S301: Obtain a plurality of pieces of measurement data by using a first sensor, where each of the plurality of pieces of measurement data includes at least velocity measurement information.

Specifically, the first sensor may be a radar sensor, a sonar sensor, an ultrasonic sensor, or a direction-finding sensor having a frequency shift measurement capability, where the direction-finding sensor obtains radial velocity information by measuring a frequency shift of a received signal relative to a known frequency. The first sensor may be an in-vehicle sensor, a ship-borne sensor, an airborne sensor, a satellite-borne sensor, or the like. For example, the sensor may be on a system, for example, a vehicle, a ship, an airplane, or an unmanned aerial vehicle, and is configured to sense an environment or a target. For example, in an assisted driving scenario or an unmanned driving scenario, one or more of the foregoing types of sensors are usually mounted on a vehicle to measure an ambient environment or a state (including a motion state) of an object and use a processing result of measurement data as a reference basis for planning and control, so that the vehicle travels safely and reliably.

It should be further noted that the first sensor herein may include one or more physical sensors. For example, the physical sensors may separately measure an azimuth, a pitch angle, and a radial velocity; or the azimuth angle, the pitch angle, and the radial velocity may be derived from measurement data of the plurality of physical sensors. This is not limited herein.

The measurement data includes at least the velocity measurement information, and the velocity measurement information may be radial velocity measurement information, for example, a radial velocity of an object or a target in the ambient environment relative to the sensor. The measurement data may further include angle measurement information, for example, azimuth and/or pitch angle measurement information of the target relative to the sensor; and may further include distance measurement information of the target relative to the sensor. In addition, the measurement data may further include direction cosine information of the object or the target in the ambient environment relative to the sensor. The measurement data information may alternatively be information transformed from original measurement data of the sensor. For example, the direction cosine information may be obtained from the azimuth and/or pitch angle information of the target relative to the sensor, or may be measured based on a rectangular coordinate location of the target and a distance from the target.

Figure 4:
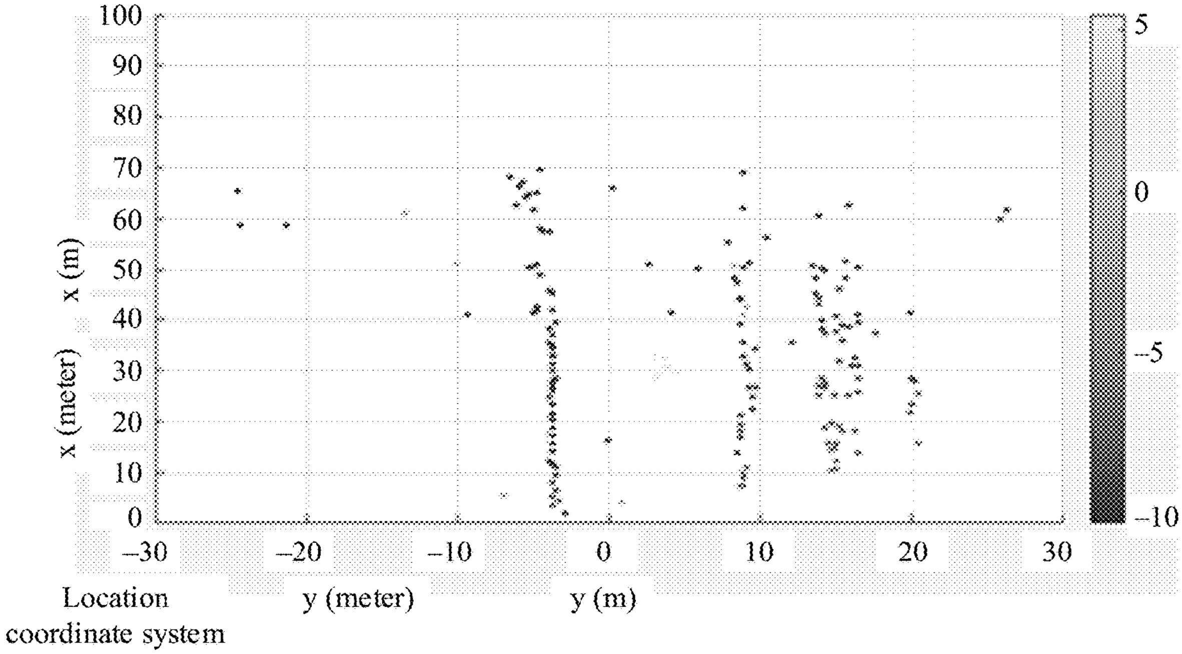
FIG. 4 is a schematic diagram of distribution of measurement data obtained through radar detection according to an embodiment of the present application.

In this embodiment of this application, using the radar sensor or the sonar sensor as an example, the sensor may periodically or aperiodically transmit a signal and obtain the measurement data from a received echo signal. For example, the transmitted signal may be a chirp signal, distance information of the target may be obtained by using a delay of the echo signal, the radial velocity information between the target and the sensor may be obtained by using a phase difference between a plurality of echo signals, and the angle information such as the azimuth and/or pitch angle information of the target relative to the sensor may be obtained by using geometry of a plurality of transmit and/or receive antenna arrays of the sensor. It may be understood that because of the diversity of the object or the target in the ambient environment, the sensor may obtain the plurality of pieces of measurement data for subsequent use. FIG. 4 shows a spatial location distribution of a plurality of pieces of measurement data obtained by a radar sensor in one frame, and the location of each piece of measurement data is a location corresponding to the location information (a distance and an azimuth) included in the measurement data point.

Step S302: Obtain a motion state of the first sensor based on measurement data in the plurality of pieces of measurement data that corresponds to a target reference object, where the motion state includes at least a velocity vector of the first sensor.

The target reference object may be an object or a target that is stationary relative to a reference system. Using an in-vehicle sensor or an unmanned aerial vehicle-borne sensor as an example, the reference system may be a geodetic coordinate system or may be an inertial coordinate system that moves at a uniform velocity relative to the ground, and the target reference object may be an object in the ambient environment, for example, a guardrail, a road edge, a lamp pole, or a building. Using a ship-borne sensor as an example, the target reference object may be a surface buoy, a lighthouse, a shore, an island building, or the like. Using a satellite-borne sensor as an example, the target reference object may be a reference object, for example, an airship, that is stationary or moves at a uniform velocity relative to a star or a satellite.

In a first optional solution, the measurement data corresponding to the target reference object may be obtained from the plurality of pieces of measurement data based on a feature of the target reference object.

The feature of the target reference object may be a geometric feature of the target reference object, for example, a curve feature such as a straight line, an arc, or a clothoid, or may be a reflectance feature, for example, a radar cross section (RCS).

Using the radar measurement data in FIG. 4 as an example, a radar measurement includes distance measurement information, azimuth measurement information, and radial velocity measurement information. When the target reference object is a guardrail or a road edge shown in FIG. 5, the target reference object has an obvious geometric feature, that is, the data of the target reference object is a straight line or a clothoid. The data of the target reference object may be separated from the plurality of pieces of measurement data by using a feature recognition technology, for example, Hough transform.

Using an example in which the Hoff transform is performed to recognize the target reference object having a straight-line geometric feature, a process of obtaining the road edge/guardrail through the Hoff transform is as follows:

A plurality of pieces of radar range measurement data and a plurality of pieces of radar azimuth measurement data are transformed to a Hough transform space according to, for example, the following formula:

$$\rho_i = r_k * \cos(\theta_k - \varphi_i)$$

$r_k$ and $\theta_k$ are a $k^{th}$ distance and a $k^{th}$ azimuth that are measured by radar. $\varphi_i$ and $\rho_i$ are Hough transform space parameters. Different values of $\rho_i$ may be obtained for different values of $\rho_i$, and typically, $\rho_i$ is a discrete value between 0 and $\pi$. In addition, it should be noted that, $\rho_i$ herein is usually obtained by quantizing $r_k \cos(\theta_k - \varphi_i)$.

For a plurality of different pieces of radar measurement data $r_k$ and $\theta_k$, counts or weights of different parameters $\varphi_i$ and $\rho_i$ corresponding to the radar measurement data $r_k$ and $\theta_k$ may be accumulated.

Parameters corresponding to one or more peaks are obtained in the Hough transform space. For example: Parameters $$\varphi_i^* \text{ and } \rho_i^*$$

corresponding to one or more count peaks or weight peaks may be obtained by using the counts or the weights of the different parameters $\varphi_i$ and $\rho_i$ in the Hough transform space, where j=1, 2, . . . , or J, and J is an integer.

The measurement data corresponding to the target reference object is obtained based on the parameters corresponding to the one or more peaks. For example, the following formula is satisfied or approximately satisfied:

$$\rho_j^* = r_k * \cos\left(\theta_k - \varphi_j^*\right).$$

Alternatively, the following inequality is satisfied or approximately satisfied:

$$\left|\rho_j^* - r_k * \cos\left(\theta_k - \varphi_j^*\right)\right| \leq T_\rho,$$

$T_\rho$ is a threshold, and may be obtained based on a distance, an azimuth, quantizing intervals of the parameters $\varphi_i$ and $\rho_i$, or resolution.

The Hough transform may alternatively be performed to identify the target reference object having other geometric features such as an arc or a clothoid. This is not enumerated herein.

In a second optional solution, the measurement data corresponding to the target reference object may alternatively be obtained from the plurality of pieces of measurement data of the first sensor based on measurement data of a second sensor.

Specifically, the second sensor may be a vision sensor, for example, a camera or a camera sensor, or may be an imaging sensor, for example, an infrared sensor or a laser radar sensor.

The second sensor may measure the target reference object within a detection range of the first sensor, where the target reference object includes the ambient environment, an object, a target, or the like.

Figure 5:
FIG. 5 is a schematic diagram of a picture photographed by a camera according to an embodiment of the present application.

Specifically, the second sensor and the first sensor may be mounted on a same platform, and the data of the second sensor and the first sensor may be transmitted on the same platform. Alternatively, the second sensor and the first sensor may be mounted on different platforms, and the measurement data is exchanged between the second sensor and the first sensor through a communication channel. For example, the second sensor is mounted on a roadside or on another in-vehicle or airborne system, and sends or receives the measurement data or other assistance information such as transform parameter information through the cloud. For example, the second sensor is a camera or a camera module. The camera or the camera module may be configured to photograph an image or a video within a detection range of the radar sensor, the sonar sensor, or the ultrasonic sensor, where the image or the video may be a partial or an entire image or video within the detection range of the first sensor. The image may be single-frame or multi-frame. FIG. 5 is a picture displayed in a video image photographed by a camera within a detection range of a radar sensor according to an embodiment of this application.

The target reference object may be determined based on the measurement data of the second sensor. For example, the target reference object may be an object that is stationary relative to the reference system.

Optionally, as described above, the reference system may be the ground or the like.

Optionally, the target reference object may be recognized by using a conventional classification or recognition method or a machine learning method, for example, by using a parametric regression method, a support vector machine method, or an image segmentation method. Alternatively, the target reference object in the measurement data such as a video or an image of the second sensor may be recognized through technical means such as artificial intelligence (AI), for example, deep learning (a deep neural network or the like).

Optionally, one or more objects may be designated as the target reference object based on an application scenario of the sensor. For example, one or more of a road edge, a roadside sign, a tree, or a building are designated as the target reference object. A pixel feature of the target reference object may be pre-stored; the measurement data such as the image or the video of the second sensor is searched for a pixel feature that is the same as or similar to the stored pixel feature; and if the pixel feature is found, it is considered that the target reference object exists in the image or the video, and the location of the target reference object in the image or the video is further determined. In short, a feature (including but not limited to the pixel feature) of the target reference object may be stored, and then the target reference object in the foregoing image is found through feature comparison.

The obtaining the measurement data corresponding to the target reference object from the plurality of pieces of measurement data of the first sensor based on measurement data of a second sensor may include:

mapping the measurement data of the first sensor to a space of the measurement data of the second sensor;

mapping the measurement data of the second sensor to a space of the measurement data of the first sensor; or mapping the measurement data of the first sensor and the measurement data of the second sensor to a common space; and determining, by using a space and based on the target reference object determined based on the measurement data of the second sensor, the measurement data that is of the first sensor and that corresponds to the target reference object.

Optionally, the space of the measurement data of the first sensor may be a space using a coordinate system of the first sensor as a reference, and the space of the measurement data of the second sensor may be a space using a coordinate system of the second sensor as a reference.

The common space may be a space using, as a reference, a coordinate system of a sensor platform on which the two sensors are located, where for example, the coordinate system may be a vehicle coordinate system, a ship coordinate system, or an airplane coordinate system, or may be a geodetic coordinate system or a coordinate system using a star, a planet, or a satellite as a reference. Optionally, the measurement data of the first sensor and the measurement data of the second sensor are mapped to the common space. Using the vehicle coordinate system as an example, a mounting location of the first sensor, for example, radar, in the vehicle coordinate system and a mounting location of the second sensor, for example, a camera, in the vehicle coordinate system may be first measured and determined in advance, and the measurement data of the first sensor and the measurement data of the second sensor are mapped to the vehicle coordinate system.

The motion state of the sensor may be determined based on the measurement data that is in the plurality of pieces of measurement data of the first sensor and that corresponds to the target reference object.

It should be noted that if the target reference object is an object that is stationary relative to the geodetic coordinate system, because the sensor platform is moving, the target reference object detected by the sensor is moving rather than being stationary relative to the sensor platform or the sensor. It may be understood that, after the measurement data of the target reference object is obtained through separation, a motion state of the target reference object may be obtained or the motion state of the sensor may be equivalently obtained based on the measurement data of the target reference object. An implementation process thereof is described as follows.

The following describes the implementation process by using an example in which the first sensor is the radar and the second sensor is the camera, and specific sensors are not limited herein.

Figure 6:
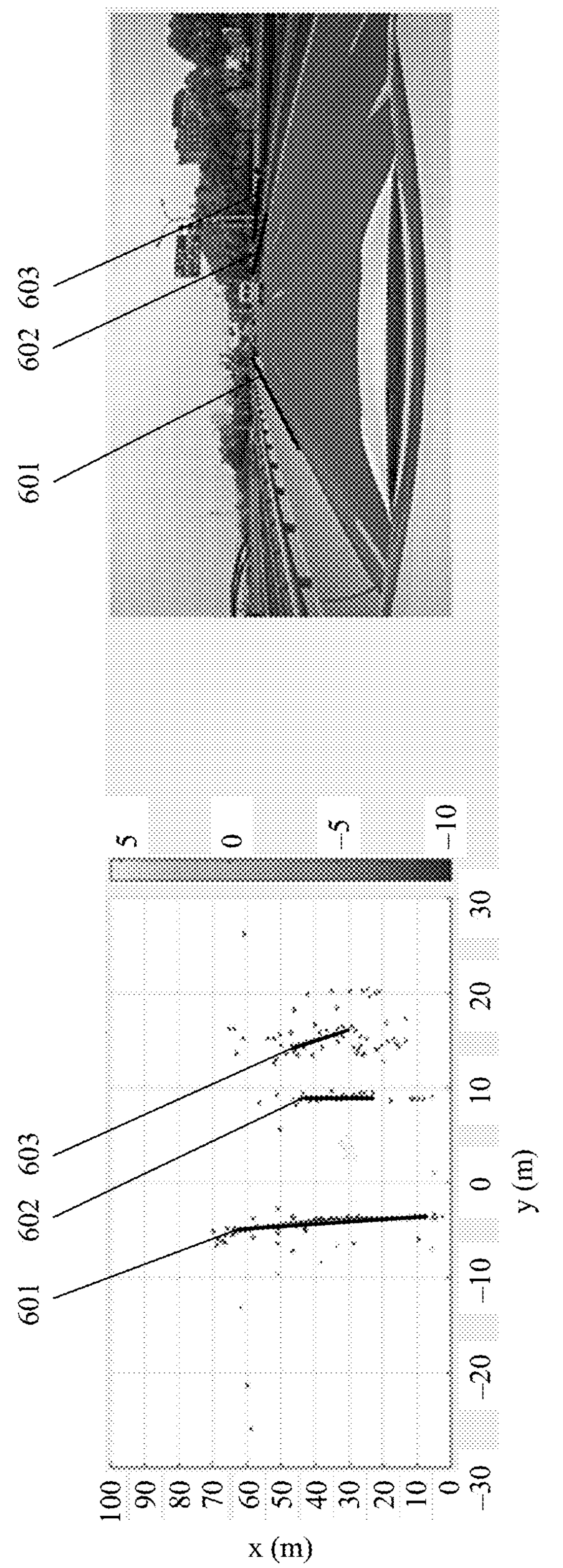
FIG. 6 is a schematic diagram of a scenario of mapping a target reference object from pixel coordinates to radar coordinates according to an embodiment of the present application.

Specifically, the plurality of pieces of measurement data obtained by the radar and the data that is of the target reference object and that is obtained by the camera may be first mapped to a same coordinate space, where the same coordinate space may be a two-dimensional or multi-dimensional coordinate space. Optionally, the plurality of pieces of measurement data obtained by the radar may be mapped to an image coordinate system in which the target reference object obtained by the camera is located, the target reference object obtained by the camera may be mapped to a radar coordinate system in which the plurality of pieces of measurement data obtained by the radar are located, or the plurality of pieces of measurement data obtained by the radar and the target reference object obtained by the camera may be mapped to another common coordinate space. As shown in FIG. 6, the target reference object may be road edges 601, 602, or 603. FIG. 6 shows a scenario in which the plurality of pieces of measurement data obtained by the radar are mapped from the radar coordinate system in which the plurality of pieces of measurement data are located to the image coordinate system in which the target reference object (represented by thick black lines) is located.

Optionally, a projection mapping relation for mapping the measurement data obtained by the radar from the radar coordinate system in which the measurement data is located to the image coordinate system is a formula 1-1.

$$z_1\begin{bmatrix}u\\v\\1\end{bmatrix} = A*B*\begin{bmatrix}x\\y\\z\\1\end{bmatrix}. \tag{1-1}$$

In the formula 1-1, A is an intrinsic parameter matrix of the camera (or the camera module). A is determined by the camera itself, and is used to determine a mapping relationship from a pixel coordinate system to the image plane coordinate system. B is an extrinsic parameter matrix. B is determined based on a relative location relationship between the camera and the radar, and is used to determine a mapping relationship from the image plane coordinate system to the radar plane coordinate system. $z_1$ is depth-of-field information. (x, y, z) is coordinates in the radar coordinate system (if vertical dimension information is ignored, z=0), and (u, v) is coordinates of the target reference object in the pixel coordinate system.

For example, in a scenario with no distortion, the intrinsic parameter matrix and the extrinsic parameter matrix may be respectively:

$$A = \begin{bmatrix}f & 0 & 0 & 0\\0 & f & 0 & 0\\0 & 0 & 1 & 0\end{bmatrix} \text{ and } B = \begin{bmatrix}R & T\\0 & 1\end{bmatrix}, \tag{1-2}$$

f is a focal length, R and T represent relative rotation and a relative offset between the radar coordinate system and the image coordinate system. Further correction may be performed for the scenario with no distortion based on a conventional technology. Details are not further described herein.

Location data measured by the radar is usually in a polar coordinate form or a spherical coordinate form, and may be first transformed into rectangular coordinates and then mapped to the image plane coordinate system according to the formula 1-1. For example, the distance and the azimuth in the foregoing radar data may be transformed into rectangular coordinates x and y, and the distance, the azimuth, and the pitch angle in the foregoing radar measurement data may be transformed into rectangular coordinates x, y, and z.

It may be understood that there may alternatively be other mapping rules that are not enumerated herein.

According to the projection transform 1-1, location measurement data in the foregoing radar measurement data is transformed to the image coordinate system, to obtain a corresponding pixel location (u, v). The pixel location may be used to determine whether the corresponding radar data is radar measurement data of the target reference object.

Specifically, target detection, image segmentation, semantic segmentation, or instance segmentation may be performed on the image or the video through deep learning, so that a mathematical representation of the target reference object can be established, where, for example, the target reference object is represented by a bounding box (Bounding Box). In this way, it may be determined whether a pixel corresponding to the foregoing radar measurement data falls within a pixel point range of the target reference object, in order to determine whether the corresponding radar measurement data corresponds to the target reference object.

In an implementation, a bounding box of the target reference object may be represented by an interval described by using the following F1 inequalities:

$$A_i u + b_i v \leq c\ldots\text{, where } i = 1, 2, \ldots\text{, or } F_1. \tag{1-3}$$

Typically, $F_1$=4. If the pixel (u, v) corresponding to the radar measurement data satisfies the inequalities, the radar measurement data corresponds to the target reference object; otherwise, the radar measurement data does not correspond to the target reference object.

In another implementation, a bounding box of the target reference object may be represented by an interval described by using $F_2$ inequalities:

$$c_i \leq a_i u + b_i v \leq d_i\text{, where } i = 1, 2, \ldots\text{, or } F_2 \tag{1-4}$$

Typically, $F_2$=2. If the pixel (u, v) corresponding to the radar measurement data satisfies the formula 1-4, the radar measurement data corresponds to the target reference object; otherwise, the radar measurement data does not correspond to the target reference object.

No limitation is imposed herein on specific implementations of the target detection, the image segmentation, the semantic segmentation, the instance segmentation, obtaining the mathematical representation of the target reference object, or determining whether the radar measurement data is data of the target reference object.

Through the foregoing projection mapping, the plurality of pieces of measurement data measured by the radar and the target reference object sensed by the camera are located in the same coordinate space. Therefore, the target reference object may be obtained based on the image or the video through detection, recognition, or segmentation, to effectively determine the radar measurement data corresponding to the target reference object.

The motion state of the first sensor may be determined based on the measurement data corresponding to the target reference object, where the motion state includes at least the velocity vector.

The measurement data of the first sensor includes at least the velocity information, where for example, the velocity information is the radial velocity information. Further, the measurement data may include the azimuth and/or pitch angle information or the direction cosine information.

Specifically, the velocity vector of the first sensor may be obtained through estimation according to the following equation:

$$-\dot{r}_k = h_k v_s - n_{\dot{r}}\text{; or equivalently} \tag{1-5}$$

$$\dot{r}_k = h_k v_T + n_{\dot{r}}, \tag{1-6}$$

where $v_s$ is the velocity vector of the first sensor, $v_T$ is a velocity vector of the target reference object, and for the target reference object, $v_s = v_T$.

Therefore, the velocity vector $v_s$ of the first sensor may be directly obtained according to the formula 1-5; or equivalently, the velocity vector $v_T$ of the target reference object is obtained according to the formula 1-6, and the velocity vector $v_s$ of the first sensor is obtained according to $v_s = -v_T$. The following descriptions use the formula 1-5 as an example, and the velocity vector $v_s$ of the first sensor may be equivalently obtained according to the formula 1-6. Details are not further described in this specification.

$\dot{r}_k$ is a $k^{th}$ piece of radial velocity measurement data, $n_{\dot{r}}$ is a corresponding measurement error, an average value of $n_{\dot{r}}$ is 0, a variance of $n_{\dot{r}}$ is $$\sigma_{\dot{r}}^2,$$

and a value of $n_{\dot{r}}$ depends on performance of the first sensor.

Using a two-dimensional velocity vector as an example, $v_s$ and $h_k$ may be respectively $$v_s = [\,v_{s,x} \quad v_{s,y}\,]^T\text{, and} \tag{1-7}$$

$$h_k = [\,\Lambda_x \quad v_y\,] \tag{1-8}$$

$v_{s,x}$ and $v_{s,y}$ are two components of the velocity vector of the first sensor, and $[\ ]^T$ represents transposition of a matrix or a vector. $\Lambda_x$ and $\Lambda_y$ are direction cosines, and may be directly measured by the first sensor, or may be calculated by using the following formula:

$$\Lambda_x = \cos\theta_k \text{ and } \Lambda_y = \sin\theta_k, \tag{1-9}$$

$$\text{where } \theta_k \text{ is am azimuth; or} \tag{1-10}$$

$$\Lambda_x = \frac{x_k}{r_k} \text{ and } \Lambda_y = \frac{y_k}{r_k},$$

where $r_k$ is obtained through distance measurement, or is calculated by using the following formula:

$$r_k = \sqrt{x_k^2 + y_k^2}\,. \tag{1-11}$$

Using a three-dimensional velocity vector as an example, $v_s$ and $h_k$ may be respectively $$v_s = [\,v_{s,x} \quad v_{s,y} \quad v_{s,z}\,]^T\text{, and} \tag{1-13}$$

$$h_k = [\,\Lambda_x \quad \Lambda_y \quad \Lambda_z].$$

$v_{s,x}$, $v_{s,y}$, and $v_{s,z}$ are three components of the velocity vector of the first sensor, and $[\ ]^T$ represents transposition of a matrix or a vector. $\Lambda_x$, $\Lambda_y$, and $\Lambda_z$ are direction cosines, and may be directly measured by the first sensor, or may be calculated by using the following formula:

$$\Lambda_x = \cos\phi_x\cos\theta_k,\ \Lambda_y = \cos\phi_k\sin\theta_k\text{, and } \Lambda_z = \sin\phi_k, \tag{1-14}$$

where $\theta_k$ is an azimuth, and $\phi_k$ is a pitch angle; or $$\Lambda_x = \frac{x_k}{r_k},\ \Lambda_y = \frac{y_k}{r_k},\ \text{and}\ \Lambda_Z = \frac{z_k}{r_k}, \tag{1-15}$$

where $r_k$ is obtained through distance measurement, or is calculated by using the following formula:

$$r_k = \sqrt{x_k^2 + y_k^2 + z_k^2}. \tag{1-16}$$

The motion state of the first sensor may be determined according to the foregoing measurement equations and based on the measurement data corresponding to the target reference object. The following describes several optional implementations for ease of understanding.

Specifically, the motion state of the first sensor may be obtained through a least squares (LS) estimation and/or sequential block filtering.

Solution 1: The motion state of the first sensor is obtained through the least squares (LS) estimation.

Specifically, a least squares estimate of the velocity vector of the first sensor may be obtained based on a first radial velocity vector and a measurement matrix corresponding to the first radial velocity vector. Optionally, the least squares estimate of the velocity vector is:

$$v_s^{LS} = -H_{N_1}^{-1}\dot{r}_{N_1}, \text{ or} \tag{1-17}$$

$$v_S^{LS} = -\left(H_{N_1}^T H_{N_1}\right)^{-1} H_{N_1}^T * \dot{r}_{N_1}, \tag{1-18}$$

where $v_s^{LS}$ is the least squares estimate of the sensor; or $$v_s^{RLS} = -\left(H_{N_1}^T H_{N_1} + R\right)^{-1} H_{N_1}^T * \dot{r}_k, \tag{1-19}$$

where $$v_s^{LS}$$

is a regularized least squares estimate of the sensor, and R is a positive-semidefinite matrix or a positive-definite matrix, and is used for regularization. For example:

$$R = \alpha \cdot I, \tag{1-20}$$

where I is a $N_1$-order unit matrix; and $\alpha$ is a nonnegative or normal number, and for example, $$\alpha = \gamma \cdot \sigma_{\dot{r}}^2 \text{ and } \gamma \geq 0.$$

The first radial velocity vector $\dot{r}_{N_1}$ is a vector including $N_1$ radial velocity measured values in $N_1$ pieces of measurement data corresponding to the target reference object, and the matrix $H_{N_1}$ is a measurement matrix corresponding to the first radial velocity vector $\dot{r}_{N_1}$, where $N_1$ is a positive integer greater than 1.

The first radial velocity vector $\dot{r}_{N_1}$ and the corresponding measurement matrix $H_{N_1}$ satisfy the following measurement equation:

$$-\dot{r}_{N_1} = H_{N_1} v_S - n_{\dot{r}}. \tag{1-21}$$

Specifically, the first radial velocity vector $\dot{r}_{N_1}$ may be represented as $\dot{r}_{N_1}=[\dot{r}_{i_1} \ldots \dot{r}_{i_{N1}}]^T$ where $\dot{r}_{i_1}$ represents an $i_1^{th}$ radial velocity measured value corresponding to the target reference object, and $n_{\dot{r}}$ is a measurement error vector corresponding to $\dot{r}_{i_1}$, and includes a corresponding radial velocity measurement error, as described above. Correspondingly, the measurement matrix $H_{N_1}$ may be represented by:

$$H_{N_1} = \begin{bmatrix} h_{i_1} \\ \vdots \\ h_{i_{N_1}} \end{bmatrix}. \tag{1-22}$$

Optionally, in an example in which the first sensor obtains azimuth measurement data and radial velocity measurement data, the radial velocity measurement matrix $H_{N_1}$ includes $h_{i_1}=(\cos\theta_{i_1}, \sin\theta_{i_1})$, $h_{i_2}=(\cos\theta_{i_2}, \sin\theta_{i_2})$, . . . , and $h_{i_1}=(\cos\theta_{i_{N1}}, \sin\theta_{i_{N1}})$, where $\theta_{i_1}$, $\theta_{i_2}$, . . . , and $\theta_{i_{N1}}$ are azimuth measured values, and $N_1 \geq 2$.

Optionally, in an example in which the first sensor obtains azimuth measurement data, pitch angle measurement data, and radial velocity measurement data, the radial velocity measurement matrix $H_{N_1}$ includes $h_{i_1}=(\cos\phi_{i_1}\cos\theta_{i_1}, \cos\phi_{i_1}\sin\theta_{i_1}, \sin\phi_{i_1})$, $h_{i_2}=(\cos\phi_{i_2}\cos\theta i_2, \cos\phi_{i_2}\sin\theta_{i_2}, \sin\phi_{i_2})$, . . . , and $h_{i_{N1}}=(\cos\phi_{i_{N1}}\cos\theta_{i_{N1}}, \cos\phi_{i_{N1}}\sin\theta_{i_{N1}}, \sin\phi_{i_{N1}})$ where $\theta_{i_1}$, $\theta_{i_2}$, . . . , and $\theta_{i_{N1}}$ are azimuth measured values, $\phi_{i_1}$, $\phi_{i_2}$, . . . , and $\phi_{i_{N1}}$ are pitch angle measured values, and $N_1 \geq 3$.

Similarly, the radial velocity measurement matrix $H_{N_1}$ in the foregoing measurement equation may alternatively be obtained by using the direction cosines, and the radial velocity measurement matrix $H_{N_1}$ includes $\Lambda_{i_1}$, $\Lambda_{i_2}$, . . . , and $\Lambda_{i_{N1}}$ where for the two-dimensional velocity vector, $N_1 \geq 2$; and for the three-dimensional velocity vector, $N_1 \geq 3$. Each component of each direction cosine vector is described above, and details are not further described herein.

In an implementation, selection of $\theta_{i_1}$, $\theta_{i_2}$, . . . , and $\theta_{i_{N1}}$ or $\phi_{i_1}$, $\phi_{i_2}$, . . . , and $\phi_{i_{N1}}$ should be made so that the intervals among $\theta_{i_1}$, $\theta_{i_2}$, . . . , and $\theta_{i_{N1}}$, or intervals among $\phi_{i_1}$, $\phi_{i_2}$, . . . , and $\phi_{i_{N1}}$ are as large as possible, and a more precise least squares estimation can be obtained. The selection that makes the intervals among the angles to be as large as possible may make the quantity of conditions of the foregoing measurement matrix as small as possible.

Optionally, each radial velocity component of the radial velocity vector is selected to make the column vectors of the corresponding measurement matrix to be orthogonal to each other as much as possible.

Solution 2: The motion state of the first sensor is obtained through the sequential block filtering.

Specifically, the motion state of the first sensor may be obtained through the sequential block filtering based on M radial velocity vectors and measurement matrices corresponding to the M radial velocity vectors, where a radial velocity vector that corresponds to the target reference object and that is used for each time of sequential block filtering includes K pieces of radial velocity measurement data.

Optionally, an estimation formula used for an $m^{th}$ time of sequential filtering is as follows:

$$v_{s,m}^{MMSE} = v_{s,m-1}^{MMSE} + G_m\left(-\dot{r}_{m,K} - H_{m,K} * v_{s,m-1}^{MMSE}\right), \quad (1\text{-}23)$$

where $m = 1, 2, \ldots$ , or $M$.

$G_m$ is a gain matrix, $\dot{r}_{m,K}$ (includes K radial velocity measured values, and $H_{m,K}$ includes K radial velocity measurement matrices, as described above. For a two-dimensional velocity vector estimation, K≥2; and for a three-dimensional velocity vector estimation, K≥3.

Optionally, the gain matrix may be:

$$G_m = P_{m,1|0} * H_{m,K}^T * \left(H_{m,K} * P_{m,1|0} * H_{m,K}^T + R_{m,K}\right)^{-1}. \quad (1\text{-}24)$$

$R_{m,K}$ is a radial velocity vector measurement error covariance matrix, and for example, may be:

$$R_{m,K} = \sigma_{\dot{r}}^2 * I_K, \quad (1\text{-}25)$$

$$P_{m,1|1} = (I - G_{m-1} H_{m-1,K}) P_{m,1|0}, \text{ and} \quad (1\text{-}26)$$

$$P_{m,1|0} = P_{m-1,1|1}. \quad (1\text{-}27)$$

Optionally, in an implementation, an initial estimation and a covariance $P_{0,1|1}=P_0$ of the initial estimation may be obtained based on prior information:

$$P_0 = Q, \text{ and} \quad (1\text{-}28)$$

$$v_{s,0}^{MMSE} = 0. \quad (1\text{-}29)$$

Q is a preset velocity estimation covariance matrix.

Solution 3: The motion state of the first sensor is obtained through the least squares and the sequential block filtering.

Specifically, the measurement data that is of the first sensor and that corresponds to the target reference object may be divided into two parts, where the first part of data is used to obtain a least squares estimate of the velocity vector of the first sensor, the second part of data is used to obtain a sequential block filtering estimate of the velocity vector of the first sensor, and the least squares estimate of the velocity vector of the first sensor is used as an initial value of the sequential block filtering.

Optionally, in an implementation, an initial estimation and a covariance $P_{0,1|1}=P_0$ of the initial estimation may be obtained based on the least squares estimation:

$$P_0 = P^{LS}, \text{ and} \quad (1\text{-}30)$$

$$v_0^{MMSE} = v^{LS}, \quad (1\text{-}31)$$

where $P^{LS} = G_0 R_{N_1} G_0^T$, $G_0 = \left(H_{N_1}^T H_{N_1}\right)^{-1} H_{N_1}^T$ or $G_0 = \left(H_{N_1}\right)^{-1}$, and $R_{N_1} = \sigma_{\dot{r}}^2 * I_{N_1}$.

Alternatively, an initial estimation and a covariance $P_{0,1|1}=P_0$ of the initial estimation are obtained based on a regularized least squares estimation:

$$P_0 = P^{RLS}, \text{ and} \quad (1\text{-}32)$$

$$v_0^{MMSE} = v^{RLS}, \quad (1\text{-}33)$$

where $P^{RLS} = G_0 R_{N_1} G_0^T$, $G_0 = \left(H_{N_1}^T H_{N_1} + R\right)^{-1} H_{N_1}^T$, and $R_{N_1} = \sigma_{\dot{r}}^2 * I_{N_1}$.

$$v_{s,m}^{MMSE}$$

is an $m^{th}$ sequential block filtering value of a velocity of the sensor, and $I_K$ is a K×K unit matrix.

Optionally, for different m, $\dot{r}_{m,K}$ may be different from each other, and $H_{m,K}$ may be different from each other. For different m, values of K may be the same or may be different, and may be selected based on different cases. The sequential filtering estimation can effectively reduce the impact of measurement noise, to improve the precision of a sensor estimation.

It should be noted that, a motion velocity of the target reference object may be first obtained, and a motion velocity of the sensor is obtained according to the following relationship:

$$v_s^{LS} = -v_T^{LS}, \quad (1\text{-}34)$$

$$v_T^{LS} = H_{N_1}^{-1} \dot{r}_{N_1}, \text{ or} \quad (1\text{-}35)$$

$$v_T^{LS} = \left(H_{N_1}^T H_{N_1}\right)^{-1} H_{N_1}^T * \dot{r}_{N_1}, \quad (1\text{-}36)$$

where $v_T^{LS}$ is a least squares estimate of the velocity of the target reference object; or $$v_S^{RLS} = -v_T^{RLS}, \quad (1\text{-}37)$$

$$v_T^{RLS} = \left(H_{N_1}^T H_{N_1} + R\right)^{-1} H_{N_1}^T * \dot{r}_k, \quad (1\text{-}38)$$

where $$v_T^{LS}$$

is a regularized least squares estimate of the velocity of the target reference object; or $$v_s^{MMSE} = -v_{T,M}^{MMSE}, \quad (1\text{-}39)$$

$$v_{T,m}^{MMSE} = v_{T,m-1}^{MMSE} + G_m\left(\dot{r}_{m,K} - H_{m,K} * v_{T,m-1}^{MMSE}\right), \quad (1\text{-}40)$$

where $m = 1, 2, \ldots$ , or $M$, where $G_m$, $\dot{r}_{m,K}$, $H_{m,K}$, and $P_{m-1}$ are as described above.

Using azimuth measurement and radial velocity measurement performed by the sensor and K=2 as an example, an $m^{th}$ second radial velocity vector is represented by $\dot{r}_{m,K}=[\dot{r}_{m,1}\ \dot{r}_{m,2}]^T$, where $\dot{r}_{m,1}$ and $\dot{r}_{m,2}$ are the first and the second pieces of radial velocity measurement data in an $m^{th}$ group of measurement data of the target reference object, and a measurement matrix corresponding to $\dot{r}_{m,1}$ and $\dot{r}_{m,2}$ is:

$$H_{m,K}=\begin{bmatrix}\cos\theta_{m,1} & \sin\theta_{m,1}\\ \cos\theta_{m,2} & \sin\theta_{m,2}\end{bmatrix}, \quad (1\text{-}41)$$

$\theta_{m,i}$ is an $i^{th}$ piece of azimuth measurement data in the $m^{th}$ group of measurement data of the target reference object, where i=1 or 2.

Similarly, using azimuth measurement, pitch angle measurement, and radial velocity measurement performed by the sensor and K=3 as an example, an $m^{th}$ second radial velocity vector is represented by $\dot{r}_{m,K}=[\dot{r}_{m,1}\ \dot{r}_{m,2}\ \dot{r}_{m,3}]^T$, where $\dot{r}_{3m,i}$ is an $i^{th}$ piece of radial velocity measurement data in an $m^{th}$ group of measurement data of the target reference object, where i=1, 2, or 3, and a measurement matrix corresponding to $\dot{r}_{3m,i}$ is:

$$H_{m,K}=\begin{bmatrix}\cos\phi_{m,1}\cdot\cos\theta_{m,1} & \cos\phi_{m,1}\cdot\sin\theta_{m,1} & \sin\phi_{m,1}\\ os\phi_{m,2}\cdot\cos\theta_{m,2} & os\phi_{m,2}\cdot\sin\theta_{m,2} & \sin\phi_{m,2}\\ os\phi_{m,3}\cdot\cos\theta_{m,3} & \cos\phi_{m,3}\cdot\sin_{m,3} & \sin\phi_{m,3}\end{bmatrix}, \quad (1\text{-}42)$$

$\theta_{m,i}$ is an $i^{th}$ piece of azimuth measurement data in the $m^{th}$ group of measurement data of the target reference object, where i=1, 2, or 3, and $\phi_{m,i}$ is an $i^{th}$ piece of pitch angle measurement data in the $m^{th}$ group of measurement data of the target reference object, where i=1, 2, or 3.

In an implementation, M groups of measurement data should be selected to enable a quantity of conditions of a measurement matrix corresponding to each group of measurement data to be as small as possible.

In an implementation, $\theta_{m,i}$, or $\theta_{m,i}$ and $\phi_{m,i}$ should be selected to enable column vectors of a corresponding measurement matrix to be orthogonal to each other as much as possible, where for $\theta_{m,i}$, i=1 or 2; and for $\theta_{m,i}$ and $\phi_{m,i}$, i=1, 2, or 3.

Optionally, the motion state of the first sensor may further include a location of the first sensor in addition to the velocity vector of the first sensor. For example, the location of the first sensor may be obtained based on the motion velocity and a time interval and with reference to a specified time start point.

After the motion state of the first sensor is obtained, various types of control may be performed based on the motion state, and specific control to be performed is not limited herein.

Optionally, the motion velocity estimation of the first sensor may be provided as a motion velocity estimation of another sensor. The other sensor is a sensor located on a same platform as the first sensor, for example, a camera, a vision sensor, or an imaging sensor mounted on a same vehicle as the radar/sonar/ultrasonic sensor. In this way, an effective velocity estimation is provided for the other sensor.

Optionally, a motion state of a target object may be compensated for based on the motion state of the first sensor, to obtain a motion state of the target object relative to the geodetic coordinate system. In this embodiment of this application, the target object may be a detected vehicle, obstacle, person, or animal, or another object that is detected.

Figure 7:
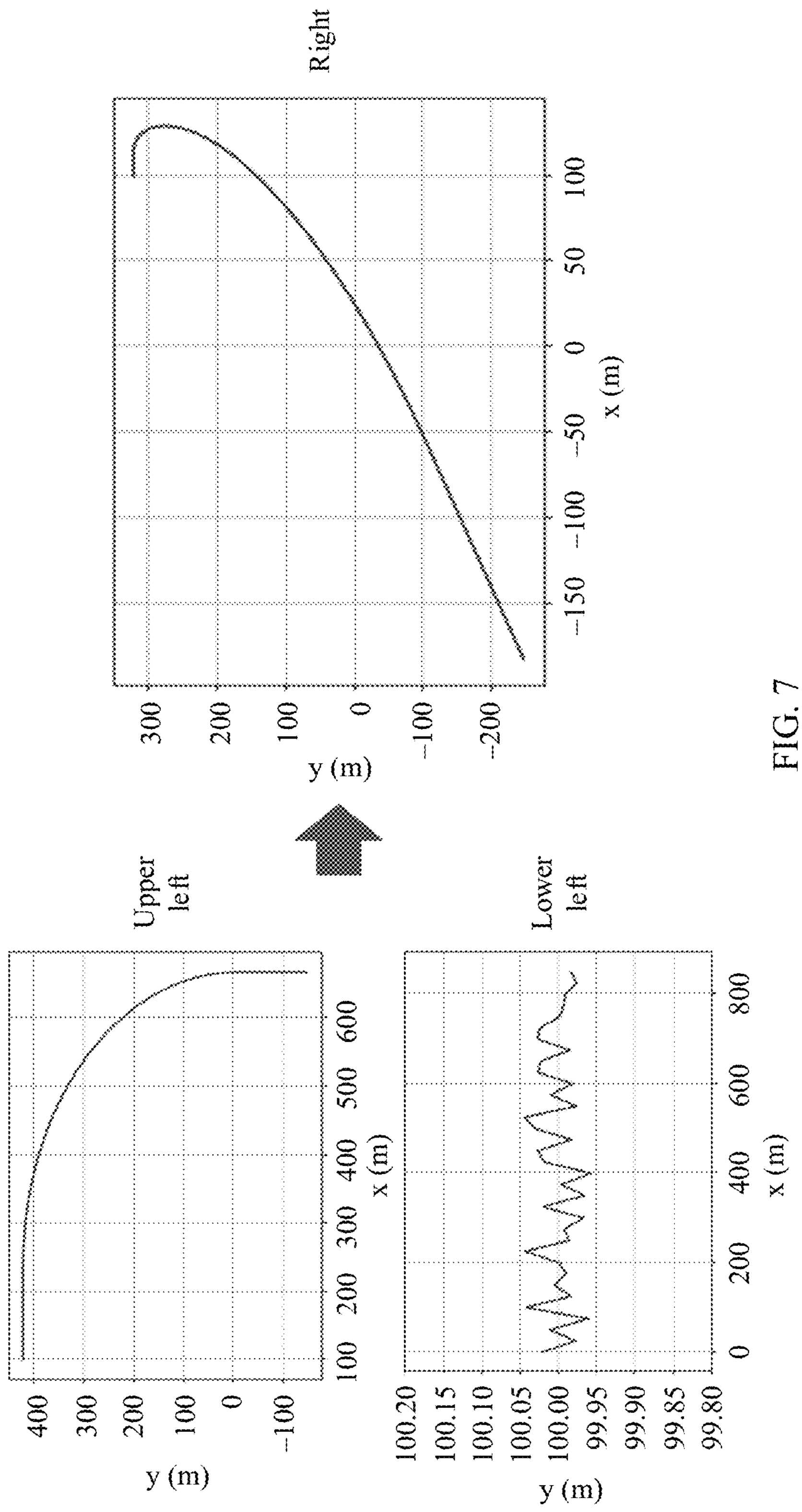
FIG. 7 is a schematic diagram of a scenario of compensating for a motion state of a detected target based on a radar motion state according to an embodiment of the present application.

As shown in FIG. 7, the lower left figure is the obtained motion state (for example, the location) of the first sensor, the right figure is the motion state (for example, a location) of the target object detected by a detection apparatus, and the upper left figure is the motion state (for example, a location) that is of the target object relative to the geodetic coordinate system and that is obtained by compensating for, based on the motion state of the first sensor, the motion state of the target object detected by the detection apparatus.

The foregoing describes measurement of the motion state of the first sensor. Actually, another component (for example, another sensor) may also exist on the platform on which the first sensor is located. Therefore, a motion state of the other component on the platform is the same as or close to the motion state of the first sensor, so that the estimation of the motion state of the first sensor may also be equivalent to or of an estimation of the motion state of the other component. Therefore, if a solution for estimating the motion state of the other component according to the foregoing principle exists, the solution also falls within the protection scope of the embodiments of the present invention.

In the method described in FIG. 3, the plurality of pieces of measurement data are obtained by using the first sensor, and the motion state of the first sensor is obtained based on the measurement data in the plurality of pieces of measurement data that corresponds to the target reference object, where the measurement data includes at least the velocity measurement information. A relative motion occurs between the first sensor and the target reference object, and the measurement data of the first sensor may include measurement information of a velocity of the relative motion. Therefore, the motion state of the first sensor may be obtained based on the measurement data corresponding to the target reference object. In addition, the target reference object may be spatially diversely distributed relative to the sensor, and particularly, may have different geometric relationships with the first sensor. Therefore, there are different measurement equations between the velocity measurement data and the first sensor, and in particular, the quantity of conditions of a measurement matrix in the measurement equation is reduced. Moreover, a large amount of measurement data corresponding to the target reference object is provided, so that the impact of noise or interference on a motion state estimation is effectively reduced. Therefore, according to the method in the present invention, the measurement data corresponding to the target reference object, in particular, the geometric relationship of the target reference object relative to the sensor and an amount, can be effectively used to reduce impact of a measurement error or interference, so that a higher precision can be achieved in this manner of determining the motion state. In addition, according to the method, a motion estimation of the sensor can be obtained by using only single-frame data, so that good real-time performance can be achieved. Further, it may be understood that estimation precision of the motion state (for example, the velocity) of the first sensor can be more effectively improved through the LS estimation and/or the sequential filtering estimation.

The foregoing describes in detail the methods in the embodiments of the present invention, and the following provides apparatuses in the embodiments of the present invention.

Figure 8:
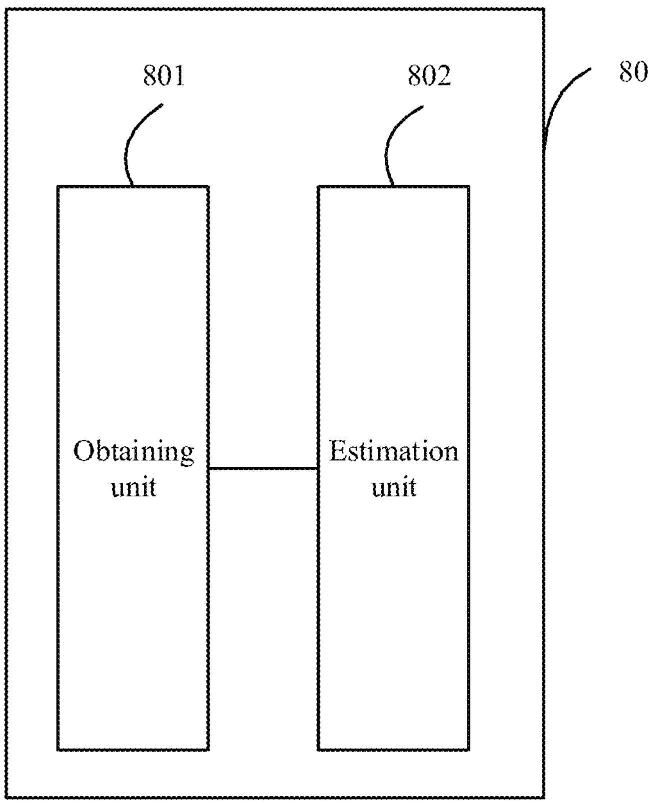
FIG. 8 is a schematic diagram of a structure of a motion state estimation apparatus according to an embodiment of the present application.

In referring to FIG. 8, FIG. 8 is a schematic diagram of a structure of a motion state estimation apparatus 80 according to an embodiment of the present invention. Optionally, the apparatus 80 may be a sensor system, a fusion sensing system, or a planning/control system (for example, an assisted driving system or an autonomous driving system) integrating the foregoing systems, and may be software or hardware. Optionally, the apparatus may be mounted or integrated on devices such as a vehicle, a ship, an airplane, or an unmanned aerial vehicle, or may be installed or connected to the cloud. The apparatus may include an obtaining unit 801 and an estimation unit 802.

The obtaining unit 801 is configured to obtain a plurality of pieces of measurement data by using a first sensor, where each of the plurality of pieces of measurement data includes at least velocity measurement information.

The estimation unit 802 is configured to obtain a motion state of the first sensor based on measurement data in the plurality of pieces of measurement data that corresponds to a target reference object, where the motion state includes at least a velocity vector of the first sensor.

In the foregoing apparatus, the plurality of pieces of measurement data are obtained by using the first sensor, and the motion state of the first sensor is obtained based on the measurement data in the plurality of pieces of measurement data that corresponds to the target reference object, where the measurement data includes at least the velocity measurement information. A relative motion occurs between the first sensor and the target reference object, and the measurement data of the first sensor may include measurement information of a velocity of the relative motion. Therefore, the motion state of the first sensor may be obtained based on the measurement data corresponding to the target reference object. In addition, the target reference object may be spatially diversely distributed relative to the sensor, and particularly, may have different geometric relationships with the first sensor. Therefore, there are different measurement equations between the velocity measurement data and the first sensor, and in particular, the quantity of conditions of a measurement matrix in the measurement equation is reduced. Moreover, a large amount of measurement data corresponding to the target reference object is provided, so that the impact of noise or interference on a motion state estimation is effectively reduced. Therefore, according to the method in the present invention, the measurement data corresponding to the target reference object, in particular, the geometric relationship of the target reference object relative to the sensor and the amount of the measurement data, can be effectively used to reduce the impact of measurement errors or interference, so that a higher precision can be achieved in this manner of determining the motion state. In addition, according to the method, a motion estimation of the sensor can be obtained by using only single-frame data, so that good real-time performance can be achieved.

In a possible implementation, the target reference object is an object that is stationary relative to a reference system. The reference system may be the ground, a geodetic coordinate system, or an inertial coordinate system relative to the ground.

In another possible implementation, after obtaining the plurality of pieces of measurement data by using a first sensor, where each of the plurality of pieces of measurement data includes at least velocity measurement information, and before obtaining the motion state of the first sensor based on measurement data in the plurality of pieces of measurement data that corresponds to a target reference object, the method further includes:

determining, from the plurality of pieces of measurement data based on a feature of the target reference object, the measurement data corresponding to the target reference object.

In another possible implementation, the feature of the target reference object includes a geometric feature and/or a reflectance feature of the target reference object.

In another possible implementation, after obtaining the plurality of pieces of measurement data by using a first sensor, where each of the plurality of pieces of measurement data includes at least velocity measurement information, and before obtaining the motion state of the first sensor based on measurement data in the plurality of pieces of measurement data that corresponds to a target reference object, the method further includes:

determining, from the plurality of pieces of measurement data of the first sensor based on data of a second sensor, the measurement data corresponding to the target reference object.

In another possible implementation, the determining, from the plurality of pieces of measurement data of the first sensor based on data of a second sensor, the measurement data corresponding to the target reference object includes:

mapping the measurement data of the first sensor to a space of the measurement data of the second sensor;

mapping the measurement data of the second sensor to a space of the measurement data of the first sensor; or mapping the measurement data of the first sensor and the measurement data of the second sensor to a common space; and determining, by using a space and based on the target reference object determined based on the measurement data of the second sensor, the measurement data that is of the first sensor and that corresponds to the target reference object.

In another possible implementation, the obtaining a motion state of the first sensor based on measurement data in the plurality of pieces of measurement data that corresponds to a target reference object includes:

obtaining the motion state of the first sensor through a least squares LS estimation and/or sequential block filtering based on the measurement data in the plurality of pieces of measurement data that corresponds to the target reference object. It may be understood that the estimation precision of the motion state (for example, a velocity) of the first sensor can be more effectively improved through the LS estimation and/or the sequential filtering estimation.

In another possible implementation, the obtaining the motion state of the first sensor through a least squares LS estimation and/or sequential block filtering based on the measurement data in the plurality of pieces of measurement data that corresponds to the target reference object includes:

performing sequential filtering based on M radial velocity vectors corresponding to the target reference object and measurement matrices corresponding to the M radial velocity vectors, to obtain a motion estimate of the first sensor, where M≥2, the radial velocity vector includes K radial velocity measured values in the measurement data in the plurality of pieces of measurement data that corresponds to the target reference object, the corresponding measurement matrix includes K directional cosine vectors, and K≥1.

In another possible implementation, the motion velocity vector of the first sensor is a two-dimensional vector, K=2, and the measurement matrix corresponding to the radial velocity vector is:

$$H_{m,K} = \begin{bmatrix} \cos\theta_{m,1} & \sin\theta_{m,1} \\ \cos\theta_{m,2} & \sin\theta_{m,2} \end{bmatrix}$$

where $\theta_{m,i}$ is an $i^{th}$ piece of azimuth measurement data in an $m^{th}$ group of measurement data of the target reference object, and i=1 or 2; or the motion velocity vector of the first sensor is a three-dimensional vector, K=3, and the measurement matrix corresponding to the radial velocity vector is:

$$H_{m,K} = \begin{bmatrix} \cos\phi_{m,1} \cdot \cos\theta_{m,1} & \cos\phi_{m,1} \cdot \sin\theta_{m,1} & \sin\phi_{m,1} \\ os\phi_{m,2} \cdot \cos\theta_{m,2} & \cos\phi_{m,2} \cdot \sin\theta_{m,2} & \sin\phi_{m,2} \\ os\phi_{m,3} \cdot \cos\theta_{m,3} & \cos\phi_{m,3} \cdot \sin\theta_{m,3} & \sin\phi_{m,3} \end{bmatrix}$$

where $\theta_{m,i}$ is an $i^{th}$ piece of azimuth measurement data in an $m^{th}$ group of measurement data of the target reference object, $\phi_{mi}$ is an $i^{th}$ piece of pitch angle measurement data in the $m^{th}$ group of measurement data of the target reference object, and i=1, 2, or 3.

In another possible implementation, a formula for the sequential filtering is:

$$v_{s,m}^{MMSE} = v_{s,m-1}^{MMSE} + G_m\left(-\dot{r}_{m,K} - H_{m,K} * v_{s,m-1}^{MMSE}\right)$$

$$G_m = P_{m,1|0} * H_{m,K}^T * \left(H_{m,K} * P_{m,1|0} * H_{m,K}^T + R_{m,K}\right)^{-1}$$

$$P_{m,1|0} = P_{m-1,1|1}$$

$$P_{m,1|1} = (I - G_{m-1} H_{m-1,K}) P_{m,1|0}$$

where $$v_{s,m}^{MMSE}$$

is a velocity vector estimate of an $m^{th}$ time of filtering, $G_m$ is a gain matrix, $\dot{r}_{m,K}$ is an $m^{th}$ radial velocity vector measured value, $R_{m,K}$ is an $m^{th}$ radial velocity vector measurement error covariance matrix, and m=1, 2, . . . , or M.

It should be noted that for implementation of the units, refer to corresponding descriptions in the method embodiment shown in FIG. 3. The various units described above may be implemented as software or hardware or software running on hardware. For example, the estimation unit 802 may comprise one or more processors configured to perform the steps shown in FIG. 3 and other components needed to support the one or more processors.

In the apparatus 80 described in FIG. 8, the plurality of pieces of measurement data are obtained by using the first sensor, and the motion state of the first sensor is obtained based on the measurement data in the plurality of pieces of measurement data that corresponds to the target reference object, where the measurement data includes at least the velocity measurement information. A relative motion occurs between the first sensor and the target reference object, and the measurement data of the first sensor may include measurement information of a velocity of the relative motion. Therefore, the motion state of the first sensor may be obtained based on the measurement data corresponding to the target reference object. In addition, the target reference object may be spatially diversely distributed relative to the sensor, and particularly, may have different geometric relationships with the first sensor. Therefore, there are different measurement equations between the velocity measurement data and the first sensor, and in particular, the quantity of conditions of a measurement matrix in the measurement equation is reduced. Moreover, a large amount of measurement data corresponding to the target reference object is provided, so that impact of noise or interference on a motion state estimation is effectively reduced. Therefore, according to the method in the present invention, the measurement data corresponding to the target reference object, in particular, the geometric relationship of the target reference object relative to the sensor and an amount, can be effectively used to reduce the impact of measurement errors or interference, so that a higher precision can be achieved in this manner of determining the motion state. In addition, according to the method, a motion estimation of the sensor can be obtained by using only single-frame data, so that good real-time performance can be achieved. Further, it may be understood that estimation precision of the motion state (for example, a velocity) of the first sensor can be more effectively improved through the LS estimation and/or the sequential filtering estimation.

Figure 9:
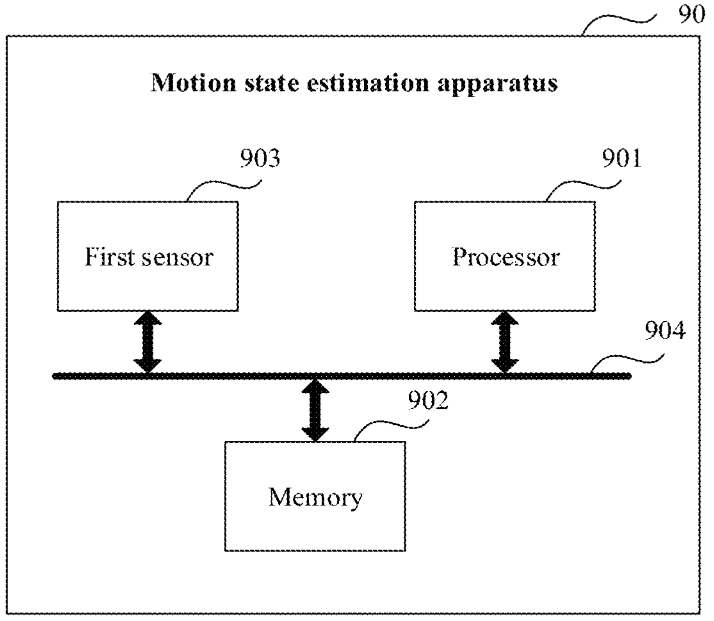
FIG. 9 is a schematic diagram of a structure of another motion state estimation apparatus according to an embodiment of the present application.

Refer to FIG. 9. FIG. 9 shows a motion state estimation 90 according to an embodiment of the present invention. The apparatus 90 includes a processor 901, a memory 902, and a first sensor 903. The processor 901, the memory 902, and the first sensor 903 are connected to each other via a bus 904.

The memory 902 includes, but is not limited to, a random access memory (RAM), a read-only memory (ROM), an erasable programmable read-only memory (EPROM), or a compact disc read-only memory (CD-ROM). The memory 902 is configured to store related program instructions and data. The first sensor 903 is configured to collect measurement data.

The processor 901 may be one or more central processing units (CPUs). When the processor 901 is one CPU, the CPU may be a single-core CPU, or may be a multi-core CPU.

The processor 901 in the apparatus 90 is configured to read the program instructions stored in the memory 902, to perform the following operations:

obtaining a plurality of pieces of measurement data by using the first sensor 903, where each of the plurality of pieces of measurement data includes at least velocity measurement information; and obtaining a motion state of the first sensor based on measurement data in the plurality of pieces of measurement data that corresponds to a target reference object, where the motion state includes at least a velocity vector of the first sensor.

In the foregoing apparatus, the plurality of pieces of measurement data are obtained by using the first sensor, and the motion state of the first sensor is obtained based on the measurement data in the plurality of pieces of measurement data that corresponds to the target reference object, where the measurement data includes at least the velocity measurement information. A relative motion occurs between the first sensor and the target reference object, and the measurement data of the first sensor may include measurement information of a velocity of the relative motion. Therefore, the motion state of the first sensor may be obtained based on the measurement data corresponding to the target reference object. In addition, usually, the target reference object may be spatially diversely distributed relative to the sensor, and particularly, may have different geometric relationships with the first sensor. Therefore, there are different measurement equations between the velocity measurement data and the first sensor, and in particular, the quantity of conditions of a measurement matrix in the measurement equation is reduced. Moreover, a large amount of measurement data corresponding to the target reference object is provided, so that the impact of noise or interference on a motion state estimation is effectively reduced. Therefore, according to the method in the present invention, the measurement data corresponding to the target reference object, in particular, the geometric relationship of the target reference object relative to the sensor and the amount of the data, can be effectively used to reduce impact of a measurement error or interference, so that a higher precision is achieved in this manner of determining the motion state. In addition, according to the method, a motion estimation of the sensor can be obtained by using only single-frame data, so that good real-time performance can be achieved.

In a possible implementation, the target reference object is an object that is stationary relative to a reference system.

Optionally, the reference system may be the ground, a geodetic coordinate system, an inertial coordinate system relative to the ground, or the like.

In another possible implementation, after obtaining the plurality of pieces of measurement data by using the first sensor, where each of the plurality of pieces of measurement data includes at least velocity measurement information, and before obtaining the motion state of the first sensor based on measurement data in the plurality of pieces of measurement data that corresponds to a target reference object, the processor 901 is further configured to:

determine, from the plurality of pieces of measurement data based on a feature of the target reference object, the measurement data corresponding to the target reference object.

In another possible implementation, the feature of the target reference object includes a geometric feature and/or a reflectance feature of the target reference object.

In another possible implementation, after obtaining the plurality of pieces of measurement data by using the first sensor, where each of the plurality of pieces of measurement data includes at least velocity measurement information, and before obtaining the motion state of the first sensor based on measurement data in the plurality of pieces of measurement data that corresponds to a target reference object, the processor 901 is further configured to:

determine, from the plurality of pieces of measurement data of the first sensor based on data of a second sensor, the measurement data corresponding to the target reference object.

In another possible implementation, the determining, from the plurality of pieces of measurement data of the first sensor based on data of a second sensor, the measurement data corresponding to the target reference object comprises:

mapping the measurement data of the first sensor to a space of the measurement data of the second sensor;

mapping the measurement data of the second sensor to a space of the measurement data of the first sensor; or mapping the measurement data of the first sensor and the measurement data of the second sensor to a common space; and determining, by using a space and based on the target reference object determined based on the measurement data of the second sensor, the measurement data that is of the first sensor and that corresponds to the target reference object.

In another possible implementation, the obtaining a motion state of the first sensor based on measurement data in the plurality of pieces of measurement data that corresponds to a target reference object comprises:

obtaining the motion state of the first sensor through a least squares LS estimation and/or sequential block filtering based on the measurement data in the plurality of pieces of measurement data that corresponds to the target reference object. It may be understood that estimation precision of the motion state (for example, a velocity) of the first sensor can be more effectively improved through the LS estimation and/or the sequential filtering estimation.

In another possible implementation, the obtaining the motion state of the first sensor through a least squares LS estimation and/or sequential block filtering based on the measurement data in the plurality of pieces of measurement data that corresponds to the target reference object comprises:

performing sequential filtering based on M radial velocity vectors corresponding to the target reference object and measurement matrices corresponding to the M radial velocity vectors, to obtain a motion estimate of the first sensor, where M≥2, the radial velocity vector includes K radial velocity measured values in the measurement data in the plurality of pieces of measurement data that corresponds to the target reference object, the corresponding measurement matrix includes K directional cosine vectors, and K≥1.

In another possible implementation, the motion velocity vector of the first sensor is a two-dimensional vector, K=2, and the measurement matrix corresponding to the radial velocity vector is:

$$H_{m,K} = \begin{bmatrix} \cos\theta_{m,1} & \sin\theta_{m,1} \\ \cos\theta_{m,2} & \sin\theta_{m,2} \end{bmatrix},$$

where $\theta_{m,i}$ is an $i^{th}$ piece of azimuth measurement data in an $m^{th}$ group of measurement data of the target reference object, and i=1 or 2; or the motion velocity vector of the first sensor is a three-dimensional vector, K=3, and the measurement matrix corresponding to the radial velocity vector is:

$$H_{m,K} = \begin{bmatrix} \cos\phi_{m,1}\cos\theta_{m,1} & \cos\phi_{m,1}\sin\theta_{m,1} & \sin\phi_{m,1} \\ os\phi_{m,2}\cos\theta_{m,2} & os\phi_{m,2}\sin\theta_{m,2} & \sin\phi_{m,2} \\ os\phi_{m,3}\cos\theta_{m,3} & \cos\phi_{m,3}\sin\theta_{m,3} & \sin\phi_{m,3} \end{bmatrix},$$

where $\theta_{m,i}$ is an $i^{th}$ piece of azimuth measurement data in an $m^{th}$ group of measurement data of the target reference object, $\phi_{m,i}$ is an $i^{th}$ piece of pitch angle measurement data in the $m^{th}$ group of measurement data of the target reference object, and i=1, 2, or 3.

In another possible implementation, a formula for the sequential filtering is:

$$v_{s,m}^{MMSE} = v_{s,m-1}^{MMSE} + G_m\left(-\dot{r}_{m,K} - H_{m,K} * v_{s,m-1}^{MMSE}\right),$$

$$G_m = P_{m,1|0} * H_{m,K}^T * \left(H_{m,K} * P_{m,1|0} * H_{m,K}^T + R_{m,K}\right)^{-1},$$

$$P_{m,1|0} = P_{m-1,1|1}, \text{ and}$$

$$P_{m,1|1} = (I - G_{m-1}H_{m-1,K})P_{m,1|0},$$

where $$v_{s,m}^{MMSE}$$

is a velocity vector estimate of an $m^{th}$ time of filtering, $G_m$ is a gain matrix, $\dot{r}_{m,K}$ is an $m^{th}$ radial velocity vector measured value, $R_{m,K}$ is an $m^{th}$ radial velocity vector measurement error covariance matrix, and m=1, 2, . . . , or M.

It should be noted that for implementation of the operations, refer to corresponding descriptions in the method embodiment shown in FIG. 3.

In the apparatus 90 described in FIG. 9, the plurality of pieces of measurement data are obtained by using the first sensor, and the motion state of the first sensor is obtained based on the measurement data in the plurality of pieces of measurement data that corresponds to the target reference object, where the measurement data includes at least the velocity measurement information. A relative motion occurs between the first sensor and the target reference object, and the measurement data of the first sensor may include measurement information of a velocity of the relative motion. Therefore, the motion state of the first sensor may be obtained based on the measurement data corresponding to the target reference object. In addition, usually, the target reference object may be spatially diversely distributed relative to the sensor, and particularly, has different geometric relationships with the first sensor. Therefore, there are different measurement equations between the velocity measurement data and the first sensor, and in particular, the quantity of conditions of a measurement matrix in the measurement equation is reduced. Moreover, a large amount of measurement data corresponding to the target reference object is provided, so that the impact of noise or interference on a motion state estimation is effectively reduced. Therefore, according to the method in the present invention, the measurement data corresponding to the target reference object, in particular, the geometric relationship of the target reference object relative to the sensor and an amount, can be effectively used to reduce the impact of a measurement error or interference, so that higher precision can be achieved in this manner of determining the motion state. In addition, according to the method, a motion estimation of the sensor can be obtained by using only single-frame data, so that good real-time performance can be achieved. Further, it may be understood that estimation precision of the motion state (for example, a velocity) of the first sensor can be more effectively improved through the LS estimation and/or the sequential filtering estimation.

An embodiment of the present invention further provides a chip system. The chip system includes at least one processor, a memory, and an interface circuit. The memory, the interface circuit, and the at least one processor are interconnected through a line, and the at least one memory stores program instructions. When the program instructions are executed by the processor, the method procedure shown in FIG. 3 is implemented.

An embodiment of the present invention further provides a computer-readable storage medium. The computer-readable storage medium stores instructions; and when the instructions are run on a processor, the method procedure shown in FIG. 3 is implemented.

An embodiment of the present invention further provides a computer program product. When the computer program product is run on a processor, the method procedure shown in FIG. 3 is implemented.

In conclusion, during implementation of the embodiments of the present invention, the plurality of pieces of measurement data are obtained by using the first sensor, and the motion state of the first sensor is obtained based on the measurement data in the plurality of pieces of measurement data that corresponds to the target reference object, where the measurement data includes at least the velocity measurement information. A relative motion occurs between the first sensor and the target reference object, and the measurement data of the first sensor may include measurement information of a velocity of the relative motion. Therefore, the motion state of the first sensor may be obtained based on the measurement data corresponding to the target reference object. In addition, usually, the target reference object is spatially diversely distributed relative to the sensor, and particularly, has different geometric relationships with the first sensor. Therefore, there are different measurement equations between the velocity measurement data and the first sensor, and in particular, the quantity of conditions of a measurement matrix in the measurement equation is reduced. Moreover, a large amount of measurement data corresponding to the target reference object is provided, so that the impact of noise or interference on a motion state estimation is effectively reduced. Therefore, according to the method in the present invention, the measurement data corresponding to the target reference object, in particular, the geometric relationship of the target reference object relative to the sensor and the amount of data, can be effectively used to reduce the impact of measurement errors or interference, so that higher precision can be achieved in this manner of determining the motion state. In addition, according to the method, a motion estimation of the sensor can be obtained by using only single-frame data, so that good real-time performance can be achieved. Further, it may be understood that estimation precision of the motion state (for example, a velocity) of the first sensor can be more effectively improved through the LS estimation and/or the sequential filtering estimation.

Persons of ordinary skill in the art may understand that all or some of the procedures of the methods in the foregoing embodiments may be implemented by a computer program instructing relevant hardware. The program may be stored in a computer-readable storage medium. When the program is executed, the procedures of the methods in the foregoing embodiments may be performed. The foregoing storage medium includes: any medium that can store program code, such as a ROM, a random access memory (RAM), a magnetic disk, or an optical disc.

What is claimed is:

1. A motion state estimation method for autonomous driving of a vehicle, comprising:

obtaining a plurality of pieces of measurement data by using a first sensor, wherein each of the plurality of pieces of measurement data comprises at least velocity measurement information;

determining, from the plurality of pieces of measurement data of the first sensor based on measurement data of a second sensor, the measurement data corresponding to one or more target reference objects, including separating the measurement data corresponding to one or more target reference objects from the plurality of pieces of measurement data;

wherein each target reference object is recognized based on the measurement data of the second sensor;

obtaining a motion state of the first sensor based on the measurement data corresponding to the one or more target reference objects, wherein the motion state comprises at least a velocity vector of the first sensor;

wherein a pixel feature of a target reference object is prestored in the second sensor, and the method further comprises: searching the measurement data of the second sensor for a matching pixel feature that matches the prestored pixel feature; based on the matching pixel feature being found, determining a location of the target reference object;

wherein the measurement data corresponding to the one or more target reference objects is separated from the plurality of pieces of measurement data by feature recognition via Hough transform;

transforming distance measurement data and azimuth measurement data of the first sensor to a Hough transform space to obtain a first parameter and a second parameter of the Hough transform space, wherein the first parameter is obtained by quantizing a result determined based on the distance measurement data, the azimuth measurement data, and the second parameter;

accumulating counts or weights of the first parameter and the second parameter;

obtaining parameters corresponding to one or more peaks in the Hough transform space;

obtaining the measurement data corresponding to the one or more target reference objects based on the parameters corresponding to the one or more peaks; and controlling the vehicle to perform autonomous driving based on the measurement data corresponding to the one or more target reference objects.

2. The method according to claim 1, wherein each target reference object is an object that is stationary relative to a reference system.

3. The method according to claim 1, wherein after obtaining the plurality of pieces of measurement data by using the first sensor, wherein each of the plurality of pieces of measurement data comprises the at least velocity measurement information, and before obtaining the motion state of the first sensor based on the measurement data corresponding to the one or more target reference objects, the method further comprises:

determining, from the plurality of pieces of measurement data based on a feature of each target reference object, the measurement data corresponding to the one or more target reference objects.

4. The method according to claim 3, wherein the feature of each target reference object comprises a geometric feature and/or a reflectance feature of the target reference object.

5. The method according to claim 1, wherein the determining, from the plurality of pieces of measurement data of the first sensor based on the measurement data of the second sensor, the measurement data corresponding to the one or more target reference objects comprises:

mapping a measurement data of the first sensor to a common space of the measurement data of the second sensor;

mapping the measurement data of the second sensor to the common space of the measurement data of the first sensor; or mapping the measurement data of the first sensor and the measurement data of the second sensor to the common space; and determining, by using the common space and based on the one or more target reference objects determined based on the measurement data of the second sensor, the measurement data that corresponds to the one or more target reference objects.

6. The method according to claim 1, wherein the obtaining the motion state of the first sensor based on the measurement data corresponding to the one or more target reference objects comprises:

obtaining the motion state of the first sensor through a least squares (LS) estimation and/or sequential block filtering based on the measurement data corresponding to the one or more target reference objects.

7. The method according to claim 6, wherein the obtaining the motion state of the first sensor through the least squares (LS) estimation and/or sequential block filtering based on the measurement data corresponding to the one or more target reference objects comprises:

performing the sequential block filtering based on M radial velocity vectors corresponding to the one or more target reference objects and measurement matrices corresponding to the M radial velocity vectors, to obtain a motion estimate of the first sensor, wherein M≥2, the radial velocity vector comprises K radial velocity measured values in the measurement data corresponding to the one or more target reference objects, the corresponding measurement matrix comprises K directional cosine vectors, and K≥1.

8. The method according to claim 7, wherein a motion velocity vector of the first sensor is a two-dimensional vector, K=2, and the measurement matrix corresponding to the radial velocity vector is:

$$H_{m,K}=\begin{bmatrix}\cos\theta_{m,1} & \sin\theta_{m,1}\\ \cos\theta_{m,2} & \sin\theta_{m,2}\end{bmatrix}\Big)$$

is an $i^{th}$ piece of azimuth measurement data in an $m^{th}$ group of measurement data of the target reference object, and i=1 or 2; or the motion velocity vector of the first sensor is a three-dimensional vector, K=3, and the measurement matrix corresponding to the radial velocity vector is:

$$H_{m,K}=\begin{bmatrix} cos\phi_{m,1}\cdot\cos\theta_{m,1} & \cos\phi_{m,1}\cdot\sin\theta_{m,1} & \sin\phi_{m,1}\\ os\phi_{m,2}\cdot\cos\theta_{m,2} & os\phi_{m,2}\cdot\sin\theta_{m,2} & \sin\phi_{m,2}\\ os\phi_{m,3}\cdot\cos\theta_{m,3} & \cos\phi_{m,3}\cdot\sin\theta_{m,3} & \sin\phi_{m,3}\end{bmatrix},$$

a in an $m^{th}$ group of measurement data of the target reference object, $\phi_{m,i}$ is an $i^{th}$ piece of pitch angle measurement data in the $m^{th}$ group of measurement data of the target reference object, i=1, 2, or 3, and m=1, 2, . . . , or M.

9. A motion state estimation apparatus of a vehicle, comprising a processor, a memory, and a first sensor, wherein the memory is configured to store program instructions, and the processor is configured to invoke the program instructions to perform the following operations:

obtaining a plurality of pieces of measurement data by using the first sensor, wherein each of the plurality of pieces of measurement data comprises at least velocity measurement information;

determining, from the plurality of pieces of measurement data of the first sensor based on measurement data of a second sensor, the measurement data corresponding to one or more target reference objects, including separating the measurement data corresponding to one or more target reference objects from the plurality of pieces of measurement data;

wherein each target reference object is recognized based on the measurement data of the second sensor;

obtaining a motion state of the first sensor based on the measurement data corresponding to the one or more target reference objects, wherein the motion state comprises at least a velocity vector of the first sensor;

wherein a pixel feature of the target reference object is prestored in the second sensor, and the operation further comprise: searching the measurement data of the second sensor for a matching pixel feature that matches the prestored pixel feature; based on the matching pixel feature being found, determining a location of the target reference object;

wherein the measurement data corresponding to the one or more target reference objects is separated from the plurality of pieces of measurement data by feature recognition via Hough transform;

transforming distance measurement data and azimuth measurement data of the first sensor to a Hough transform space to obtain a first parameter and a second parameter of the Hough transform space, wherein the first parameter is obtained by quantizing a result determined based on the distance measurement data, the azimuth measurement data, and the second parameter;

accumulating counts or weights of the first parameter and the second parameter;

obtaining parameters corresponding to one or more peaks in the Hough transform space;

obtaining the measurement data corresponding to the one or more target reference objects based on the parameters corresponding to the one or more peaks; and controlling the vehicle to perform autonomous driving based on the measurement data corresponding to the one or more target reference objects.

10. The apparatus according to claim 9, wherein each target reference object is an object that is stationary relative to a reference system.

11. The apparatus according to claim 9, wherein after obtaining the plurality of pieces of measurement data by using the first sensor, wherein each of the plurality of pieces of measurement data comprises the at least velocity measurement information, and before obtaining the motion state of the first sensor based on the measurement data corresponding to the one or more target reference objects, the processor is further configured to:

determine, from the plurality of pieces of measurement data based on a feature of each target reference object, the measurement data corresponding to the one or more target reference objects.

12. The apparatus according to claim 11, wherein the feature of each target reference object comprises a geometric feature and/or a reflectance feature of the target reference object.

13. The apparatus according to claim 9, wherein the determining, from the plurality of pieces of measurement data of the first sensor based on the measurement data of the second sensor, the measurement data corresponding to the one or more target reference objects comprises:

mapping a measurement data of the first sensor to a common space of the measurement data of the second sensor;

mapping the measurement data of the second sensor to the common space of the measurement data of the first sensor; or mapping the measurement data of the first sensor and the measurement data of the second sensor to the common space; and determining, by using the common space and based on the one or more target reference objects determined based on the measurement data of the second sensor, the measurement data that corresponds to the one or more target reference objects.

14. The apparatus according to claim 9, wherein the obtaining the motion state of the first sensor based on the measurement data that corresponds to the one or more target reference objects comprises:

obtaining the motion state of the first sensor through a least squares (LS) estimation and/or sequential block filtering based on the measurement data that corresponds to the one or more target reference objects.

15. The apparatus according to claim 14, wherein the obtaining the motion state of the first sensor through the least squares (LS) estimation and/or sequential block filtering based on the measurement data that corresponds to the one or more target reference objects comprises:

performing the sequential block filtering based on M radial velocity vectors corresponding to the one or more target reference objects and measurement matrices corresponding to the M radial velocity vectors, to obtain a motion estimate of the first sensor, wherein M≥2, the radial velocity vector comprises K radial velocity measured values in the measurement data that corresponds to the one or more target reference objects, the corresponding measurement matrix comprises K directional cosine vectors, and K≥1.

16. The apparatus according to claim 15, wherein a motion velocity vector of the first sensor is a two-dimensional vector, K=2, and the measurement matrix corresponding to the radial velocity vector is:

$$H_{m,K} = \begin{bmatrix} \cos\theta_{m,1} & \sin\theta_{m,1} \\ \cos\theta_{m,2} & \sin\theta_{m,2} \end{bmatrix}\Big]\Big)$$

is an $i^{th}$ piece of azimuth measurement data in an $m^{th}$ group of measurement data of the target reference object, and i=1 or 2; or the motion velocity vector of the first sensor is a three-dimensional vector, K=3, and the measurement matrix corresponding to the radial velocity vector is:

$$H_{m,K} = \begin{bmatrix} \cos\phi_{m,1}\cos\theta_{m,1} & \cos\phi_{m,1}\sin\theta_{m,1} & \sin\phi_{m,1} \\ os\phi_{m,2}\cos\theta_{m,2} & os\phi_{m,2}\sin\theta_{m,2} & \sin\phi_{m,2} \\ os\phi_{m,3}\cos\theta_{m,3} & \cos\phi_{m,3}\sin\theta_{m,3} & \sin\phi_{m,3} \end{bmatrix},$$

ta in an $m^{th}$ group of measurement data of the target reference object, $\phi_{m,i}$ is an $i^{th}$ piece of pitch angle measurement data in the $m^{th}$ group of measurement data of the target reference object, i=1, 2, or 3, and m=1, 2, . . . , or M.

17. A non-transitory computer readable medium, wherein the non-transitory computer readable medium stores program instructions, and when the program instructions are executed by a processor of a vehicle, the processor is enabled to perform a method of:

obtaining a plurality of pieces of measurement data by using a first sensor, wherein each of the plurality of pieces of measurement data comprises at least velocity measurement information;

determining, from the plurality of pieces of measurement data of the first sensor based on measurement data of a second sensor, the measurement data corresponding to one or more target reference objects, including separating the measurement data corresponding to one or more target reference objects from the plurality of pieces of measurement data;

wherein each target reference object is recognized based on the measurement data of the second sensor;

obtaining a motion state of the first sensor based on the measurement data corresponding to the one or more target reference objects, wherein the motion state comprises at least a velocity vector of the first sensor;

wherein a pixel feature of a target reference object is prestored in the second sensor, and the method further comprises: searching the measurement data of the second sensor for a matching pixel feature that matches the prestored pixel feature; based on the matching pixel feature being found, determining a location of the target reference object;

wherein the measurement data corresponding to the one or more target reference objects is separated from the plurality of pieces of measurement data by feature recognition via Hough transform;

transforming distance measurement data and azimuth measurement data of the first sensor to a Hough transform space to obtain a first parameter and a second parameter of the Hough transform space, wherein the first parameter is obtained by quantizing a result determined based on the distance measurement data, the azimuth measurement data, and the second parameter;

accumulating counts or weights of the first parameter and the second parameter;

obtaining parameters corresponding to one or more peaks in the Hough transform space;

obtaining the measurement data corresponding to the one or more target reference objects based on the parameters corresponding to the one or more peaks; and controlling the vehicle to perform autonomous driving based on the measurement data corresponding to the one or more target reference objects.

18. The non-transitory computer readable medium according to claim 17, wherein each target reference object is an object that is stationary relative to a reference system.

19. The non-transitory computer readable medium according to claim 17, wherein after obtaining the plurality of pieces of measurement data by using the first sensor, wherein each of the plurality of pieces of measurement data comprises the at least velocity measurement information, and before obtaining the motion state of the first sensor based on the measurement data corresponding to the one or more target reference objects, the method further comprises:

determining, from the plurality of pieces of measurement data based on a feature of each target reference object, the measurement data corresponding to the one or more target reference objects.

20. The non-transitory computer readable medium according to claim 17, wherein a feature of each target reference object comprises a geometric feature and/or a reflectance feature of the target reference object.

* * * * *